(12) United States Patent
Feinmesser et al.

(10) Patent No.: US 11,601,514 B2
(45) Date of Patent: Mar. 7, 2023

(54) MICROLOCATIONS USING TAGGED DATA

(71) Applicant: Apple Inc., Cupertino, CA (US)

(72) Inventors: Yoav Feinmesser, Tel Aviv (IL); Rafi Vitory, Or Akiva (IL); Ron Eyal, Herzliya (IL); Eyal Waserman, Netanya (IL); Yunxing Ye, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/496,479

(22) Filed: Oct. 7, 2021

(65) Prior Publication Data

US 2022/0394101 A1     Dec. 8, 2022

Related U.S. Application Data

(60) Provisional application No. 63/197,431, filed on Jun. 6, 2021.

(51) Int. Cl.
| | |
|---|---|
| *G06F 15/16* | (2006.01) |
| *H04L 67/52* | (2022.01) |
| *G06N 20/00* | (2019.01) |
| *H04W 4/38* | (2018.01) |
| *H04W 4/33* | (2018.01) |
| *H04L 67/50* | (2022.01) |

(52) U.S. Cl.
CPC ............ *H04L 67/52* (2022.05); *G06N 20/00* (2019.01); *H04L 67/535* (2022.05); *H04W 4/33* (2018.02); *H04W 4/38* (2018.02)

(58) Field of Classification Search
None
See application file for complete search history.

(56) References Cited

U.S. PATENT DOCUMENTS

| | | | | |
|---|---|---|---|---|
| 8,103,307 | B2* | 1/2012 | Silverbrook | H04M 1/72445 |
| | | | | 455/418 |
| 9,110,159 | B2* | 8/2015 | Vartanian | H04W 4/33 |
| 9,589,401 | B2* | 3/2017 | Chao | G07C 9/28 |
| 9,713,118 | B1* | 7/2017 | DeLuca | H04W 4/025 |
| 9,996,804 | B2* | 6/2018 | Bowers | G06N 20/00 |
| 2014/0358828 | A1 | 12/2014 | Phillipps et al. | |
| 2016/0316325 | A1* | 10/2016 | Sadr | H04W 4/027 |
| 2019/0102684 | A1 | 4/2019 | Beran et al. | |
| 2020/0348662 | A1* | 11/2020 | Cella | H04B 17/309 |

FOREIGN PATENT DOCUMENTS

WO    2017/184470 A2    10/2017

* cited by examiner

*Primary Examiner* — Atta Khan
(74) *Attorney, Agent, or Firm* — Kilpatrick Townsend & Stockton LLP

(57) ABSTRACT

A semi-supervised machine learning model can provide for classifying an input data point as associated with a particular target location or a particular action. Each data point comprises one or more sensor values from one or more signals emitted by one or more signal sources located within a physical area. A tagged sample set and an untagged sample set are combined to train the machine learning model. Each tagged sample includes a respective data point and a label representing a respective location/action. Each untagged sample includes a data point, but is unlabeled. Once trained, given a current data point, the machine learning model can classify the current data point as associated with a particular location/action, after which a target object (e.g., other device or application to be used) can be predicted.

20 Claims, 15 Drawing Sheets

MICROLOCATIONS USING TAGGED DATA

CROSS-REFERENCES TO RELATED APPLICATIONS

This application claims priority under 35 U.S.C. § 119(e) to U.S. Provisional Application No. 63/197,431, filed on Jun. 6, 2021 entitled, "MICROLOCATIONS USING TAGGED DATA," the content of which are herein incorporated by reference in its entirety.

BACKGROUND

Modern mobile devices (e.g., smartphones) may contain many applications. Each application may be designed to perform one or more specific functions. For instance, an application may be designed to connect a user with friends, control a television set, or inform a user of current events. As modern mobile devices become more integrated with modern day life, the number of applications stored on the mobile devices increases. It is not uncommon for modern mobile phones to have hundreds of applications. Having numerous applications may allow the mobile device to be particularly useful to the user; however, it may be difficult and time consuming for the user to find and run a desired application amongst all of the available applications.

Some modern mobile devices are capable of suggesting or recommending an application to a user to minimize the time it takes for the user to find a desired application to run. For instance, some modern devices can suggest an application when the device is positioned at a location according to the device's GPS coordinates. However, using GPS coordinates to determine a location of the device limits the resolution at which the device can determine its position. Furthermore, GPS service requires an established communication line with GPS satellites. If the connection between the device and the GPS satellites is severed, the device will be unable to receive GPS coordinates and thus be unable to determine its location to predict an application to the user.

Thus, improvements to determining position in indoor locations and identifying an application for a user based upon the determined position are desired.

SUMMARY

Embodiments provide improved mobile devices and methods for recommending applications and/or accessory devices, or automatically performing an action with the application based on historical usage of the application at identifiable locations (which may be referred to as microlocations) using sensor measurements. A semi-supervised machine learning model is provided for classifying an input data point as associated with a particular cluster of a plurality of clusters of data points. A tagged sample set and an untagged sample set are combined to train the machine learning model. Each tagged sample includes a respective data point and a label representing a respective cluster. Each untagged sample includes a data point, but is unlabeled.

According to some embodiments, the tagged samples can be labeled with locations (e.g., bedroom, living room, kitchen, etc.). Given a current data point, the machine learning model classifies the current data point as associated with a particular location. Each of a set of applications can have a separate dedicated machine learning model. A model of an application can provide a probability of an action occurring at a given location based on historical actions at the given location, and an arbiter module can determine which action to perform based on the location predicted by the machine learning models for a set of applications.

According to some other embodiments, the tagged samples can be labeled with actions (e.g., turning on the bedroom light, opening the garage door, etc.). Given a current data point, the machine learning model classifies the current data point as associated with a particular action. An application can recommend the particular action on the mobile device, or automatically perform the particular action.

Other embodiments are directed to systems, portable consumer devices, and computer readable media associated with methods described herein.

A better understanding of the nature and advantages of embodiments of the present disclosure may be gained with reference to the following detailed description and the accompanying drawings.

DETAILED DESCRIPTION

Figure 1A:
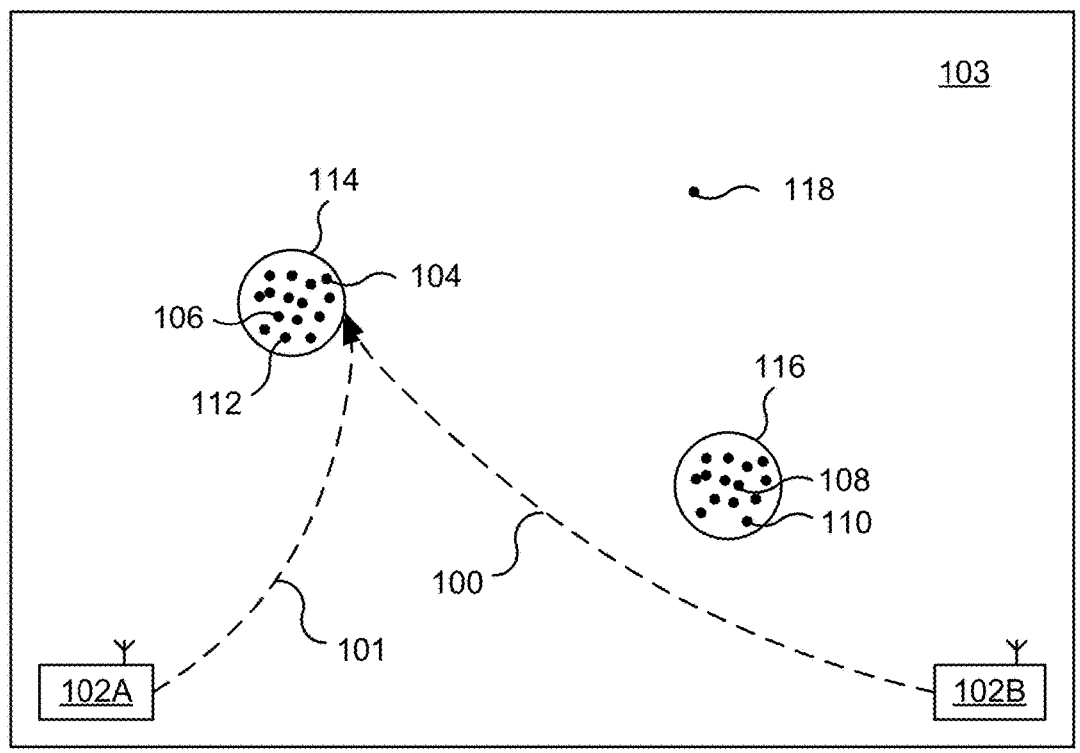
FIG. 1A is a simplified diagram illustrating clusters of physical positions in physical space.

An "application" can be a client application that is executed by a processor of a device (e.g., executed within an operating system), or can be provided as a part of an operating system, or be provided by third party developers and downloaded to the device. An application may be a specific part of the operating system designed to perform a specific function when executed by a processor. An application (e.g., home application) on a mobile device may be used to control other devices, such as accessory devices (e.g., kitchen appliances, lightings, thermostat, smart locks on doors, window shades, etc.), throughout a home. A user of the home application may be in the same room as the accessory device that is controlled or may be in a different room from the accessory device that is being controlled. For example, a user may be in their kitchen when they use the home application on their mobile device to close the garage door.

An "accessory device" can be a device that is in or in the vicinity of a particular environment, region or location, such as in a home, apartment or office. An accessory device can include a garage door, door locks, fans, lighting device (e.g., lamps), a thermometer, windows, window blinds, kitchen appliances, and any other devices that are configured to be controlled by an application, such as a home application. An accessory device can be determined or associated with a home by the home application. An accessory device can be determined by, for example, a mobile device automatically scanning an environment for any accessory devices, or a user may manually enter accessory device information via, for example, the home application.

Users often perform the same or repeated actions with accessory devices while in a particular location. For example, every time a user comes home from work, they may close the garage door when they are in the kitchen. In addition, when it is dark outside, the user may turn on a lamp in the living room or change the temperature on a thermostat while in the living room. Therefore, certain activities with respect to devices in a home may be performed regularly and repeatedly (e.g., daily, several times throughout a day) while the user is in a certain location. This can be a time consuming and tedious task for a user since these tasks are performed regularly or several times throughout the day.

Embodiments provide improved mobile devices and methods for recommending applications and/or accessory devices, or automatically performing an action with the application based on historical usage of the application at identifiable locations (which may be referred to as microlocations) using sensor measurements. Sensor(s) on the mobile device (e.g., an antenna and associated circuitry) can measure sensor values from wireless signals emitted by one or more signal sources that are essentially stationary, e.g., a wireless router in the home or a network enabled appliance. These sensor values are reproducible at a same physical position of the mobile device, and thus the sensor values can be used as a proxy for physical position. In this manner, the sensor values can form a sensor position, although in sensor space, as opposed to physical space. A "sensor position" may be a multi-dimensional data point defined by a separate sensor value for each dimension. In various embodiments, a parameter of a wireless signal can be a signal property (e.g., signal strength or time-of-flight, such as round trip time (RTT)), or other sensor values measured by a sensor of a mobile device, e.g., relating to data conveyed in the one or more wireless signals.

A "cluster" corresponds to a group of sensor positions (e.g., scalar data points, multi-dimensional data points, etc.) at which measurements have been made. Sensor positions can be determined to lie in a cluster according to embodiments described herein. For example, the sensor positions of a cluster can have parameters that are within a threshold distance of each other or from a centroid of a cluster. When viewed in sensor space, a cluster of sensor positions appears as a group of sensor positions that are close to one another. A cluster of sensor positions can be located, for example, in a room of a house or in a particular area (e.g., hallway, front door area) of a house.

A location in a house or building can also be referred to as a "microlocation." A location can be referred to as a microlocation because the location refers to a specific area in, for example, the user's home. In addition, a location or microlocation can also be referred to as a cluster of locations. The terms location, microlocation, and cluster of locations may refer to a same area or region. A home may have a number of locations. A location can correspond to a room in a house or other areas in a house. For example, a location can be a backyard area, a front door area or a hallway area.

According to some embodiments, a semi-supervised machine learning model is provided for classifying an input data point (e.g., sensor values) as associated with a particular cluster of a plurality of clusters of data points. A tagged sample set and an untagged sample set are combined to train the machine learning model. Each tagged sample includes a respective data point (e.g., sensor values) and a label representing a respective cluster. Each untagged sample includes a data point, but is unlabeled.

According to some embodiments, the tagged samples can be labeled with locations (e.g., bedroom, living room, kitchen, etc.). Given a current data point, the machine learning model classifies the current data point as associated with a particular location. Each of a set of applications can have a separate dedicated machine learning model. A model of an application can provide a probability of an action occurring at a given location based on historical actions at the given location, and an arbiter module can determine which action to perform based on the location predicted by the machine learning models for a set of applications. According to some other embodiments, the tagged samples can be labeled with actions (e.g., turning on the bedroom light, opening the garage door, etc.). Given a current data point, the machine learning model classifies the current data point as associated with a particular action. An application can recommend the particular action on the mobile device, or automatically perform the particular action. Therefore, user experience can be enhanced.

In the following, section I discusses sensor measurements and clusters. Section II discusses predicting user interaction with a device, in particular, using an unsupervised machine learning model to generate clusters. Section III discusses events triggering prediction. Section IV discusses possible issues with unsupervised machine learning for microlocation. Section V discusses semi-supervised machine learning for microlocation according to some embodiments.

I. Sensor Measurements and Clusters

While a mobile device is positioned at a physical location within a home or other location region, the mobile device can detect a triggering event and then measure signals emitted from one or more signal sources existing at that point in physical space. For instance, the mobile device may detect a button press, which acts as a triggering event and causes the mobile device to measure signals (e.g., WiFi, BT, BLE, UWB signals) emitted from any signal source, e.g., electronic devices, such as a wireless router, a WiFi equipped appliance (e.g., set top box, smart home device), or a Bluetooth device. The detected signals may be used to generate a multi-dimensional data point of sensor values in sensor space, where each dimension in sensor space can correspond to a property of a signal emitted from a signal source. The multi-dimensional data point may represent the sensor position of the mobile device in sensor space, where the sensor position corresponds to the physical position of the mobile device in physical space.

FIG. 1A is a simplified diagram illustrating a plurality of physical positions in physical space 103. As examples, physical space 103 can be the interior of a home, an office, a store, or other building. Physical space 103 may include a plurality of signal sources, such as signal sources 102A and 102B. Each signal source can emit wireless communication signals, as are emitted from a wireless router or a Bluetooth device. A signal source can be considered a stationary device, as their position does not typically change.

A mobile device may be located within physical space 103 such that one or more signals emitted from signal sources 102A and 102B are detected. For example, the mobile device may be located at physical position 104 in FIG. 1A, where signals 101 and 100 are detected from signal sources 102A and 102B, respectively. It is to be appreciated that the mobile device may only measure one of signals 101 and 100 at some positions, e.g., due to signal degradation at certain positions. Furthermore, the mobile device can be at a physical position where signals from other signal sources (not shown) that are outside of physical space 103 can be detected, and that techniques herein are not limited to physical positions where the mobile device can only detect signals 101 and 100.

Typical human behavior results in the mobile device being used in some physical locations more often than other physical locations. For example, a user may use a mobile device more often when the user is on a couch or in a bed. These physical locations may be represented by clusters of physical positions, such as clusters 114 and 116 of physical positions. Each cluster may have a group of physical positions that are located close together. As an example, cluster 114 may include physical positions 104, 106, and 112. As shown, cluster 116 includes physical positions 108 and 110. The mobile device may be configured to determine when the mobile device is in one of these clusters based on the detected signals (e.g., signals 100 and 101) and identify an application that is associated with the cluster.

As part of detecting signals at any of the physical positions using sensor(s) of the mobile device, the mobile device may measure one or more sensor values from signals emitted from signal sources 102A and 102B. For instance, if the mobile device is at physical position 104, the mobile device may measure sensor values from signal 101 emitted from signal source 102A and signal 100 from signal source 102B. The measured sensor values may be signal properties of signal 101 and signal 100. The measured sensor values may be used to form a sensor position in sensor space, as shown in FIG. 1B.

Figure 1B:
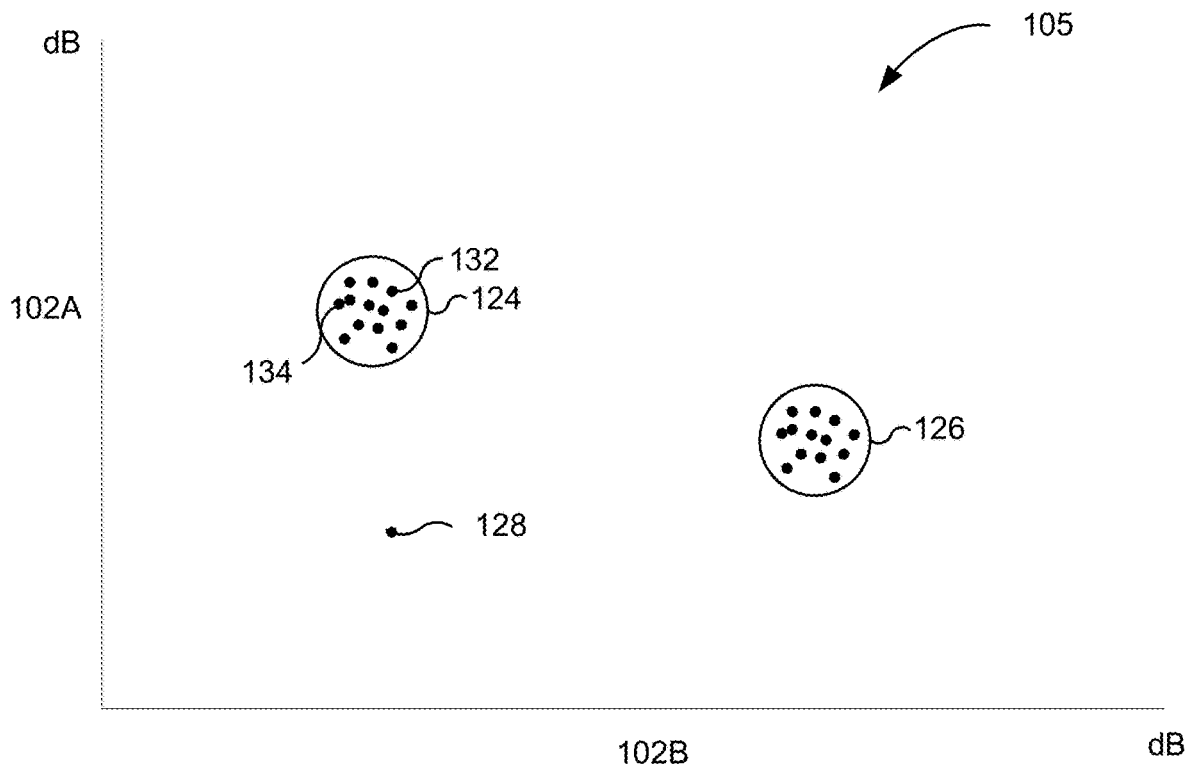
FIG. 1B is a simplified diagram illustrating clusters of sensor positions in sensor space corresponding to the physical positions in physical space of FIG. 1A.

FIG. 1B is a simplified diagram illustrating a plurality of sensor positions in sensor space 105, which corresponds to physical space 103. Sensor space 105 is depicted as a plot of measured sensor positions in signal strength. The X axis may represent measured values of signals from signal source 102B in dB increasing to the right, and the Y axis may represent measured values of signals from signal source 102A in dB increasing upwards. Although FIG. 1B illustrates an example in which the sensor space has two dimensions (e.g., sensor values from signals from signal source 102A and signal source 102B, respectively), a sensor space can include more or fewer dimensions.

The sensor positions in sensor space correspond to respective physical positions in physical space 103. For example, measured sensor values at physical position 104 in FIG. 1A corresponds to a sensor position 132 in sensor space shown in FIG. 1B. Sensor position 132 is represented as a two-dimensional data point where one dimension corresponds to a sensor value from signal source 102A and the other dimension corresponds to a sensor value from signal source 102B. Sensor space 105 may include clusters of sensor positions, e.g., cluster 124 of sensor positions and cluster 126 of sensor positions. Clusters 124 and 126 of sensor positions correspond with clusters 114 and 116 of physical positions in FIG. 1A, respectively.

Clusters 124 and 126 may be unlabeled locations, meaning the mobile device does not know the actual physical coordinates corresponding to clusters 124 and 126. The device may only know that there exists a cluster of sensor positions that have similar sensor values and that the cluster represents a discrete location in physical space. However, the mobile device may perform functions based on sensor positions in sensor space such that use of the mobile device in physical space is benefitted. For instance, the mobile device may determine a sensor position of the mobile device and suggest an application to the user based on whether the sensor position is within a cluster in which pattern of application usage is known. Method of forming clusters and suggesting an application according to a sensor position are further discussed below.

Accordingly, a sensor position can correspond to a set of one or more sensor values measured by sensor(s) of a mobile device at a physical position in physical space from one or more wireless signals emitted by one or more signal sources (e.g., external devices such as networking devices). A sensor value can be a measure of a signal property, e.g., signal strength, time-of-flight, or data conveyed in a wireless signal, as may occur if a signal source measures a signal property from the mobile device and sends that value back to the mobile device. Each sensor value of a set can correspond to a different dimension in sensor space, where the set of one or more sensor values forms a data point (e.g., a multi-dimensional data point, also called a feature vector) in the sensor space.

In the example shown in FIG. 1A, sensor values for sensor positions in cluster 114 may be higher for signal source 102A (which is in the vertical axis in FIG. 1B) than the sensor values for sensor positions in cluster 116, e.g., when the sensor value is signal strength. This may be due to the fact that physical positions in cluster 114 are closer to signal source 102A than physical positions in cluster 116 are to signal source 102A. When the sensor value is a signal property of time-of-flight, the values for cluster 114 would be smaller than for cluster 116.

A given measurement of the one or more wireless signals obtained at a physical position may be made one or more times over a time interval to obtain a set of sensor value(s). Two measurements at two different times can correspond to a same sensor position, e.g., when the two measurements are made at a same physical position at the two different times. A sensor position can have a value of zero for a given dimension, e.g., if a particular wireless signal is not measured, or have a nominal value, e.g. in case of low signal power (−100 dB RSSI) or have an uncertainty that is large.

Groups of sensor positions having similar parameters may form a cluster, which can be used to define a discrete location. One or more clusters may be used to identify an application or an accessory device to suggest to a user in, for example, a message (e.g., display on a screen or an audio message).

Applications and/or accessory devices can be associated with the one or more clusters. Specifically, applications and accessory devices can be associated with a particular location of the mobile device. A location that refers to a specific area in a user's home can be referred to as a microlocation. A microlocation can also be referred to as a cluster of locations. The terms location, microlocation and cluster of locations may refer to a same area or region. A location can correspond to a room in a house or other areas in a house. For example, a location can be a backyard area, a front door area or a hallway area. Although a home is used as an example, any area or room in which accessory devices are located can be used in determining a cluster of locations.

II. Predicting User Interaction with a Device

The mobile device may identify which applications (or accessory devices) are run by the user at each sensor position. After collecting sensor positions and corresponding applications run by the user at the sensor positions, the device may generate clusters of sensor positions (e.g., periodically at night) and associate one or more applications that are likely to be run by the user with the clusters of sensor positions. Accordingly, when a subsequent triggering event is detected, the device may generate a new sensor position and compare the new sensor position to the generated clusters of sensor positions. If the new sensor position is determined to be within a threshold distance to one of the clusters of sensor positions, one or more applications associated with that cluster of sensor positions may be identified and used in an action, e.g., provided to the user as a suggested application. The threshold distance may be a distance represented in units of decibels (e.g., for received signal strength indication (RSSI)) or meters (e.g., for time-of-flight (TOF)), depending on the units of the sensor position, as will be discussed further herein.

A. Learning and Generating Clusters

Figure 2A:
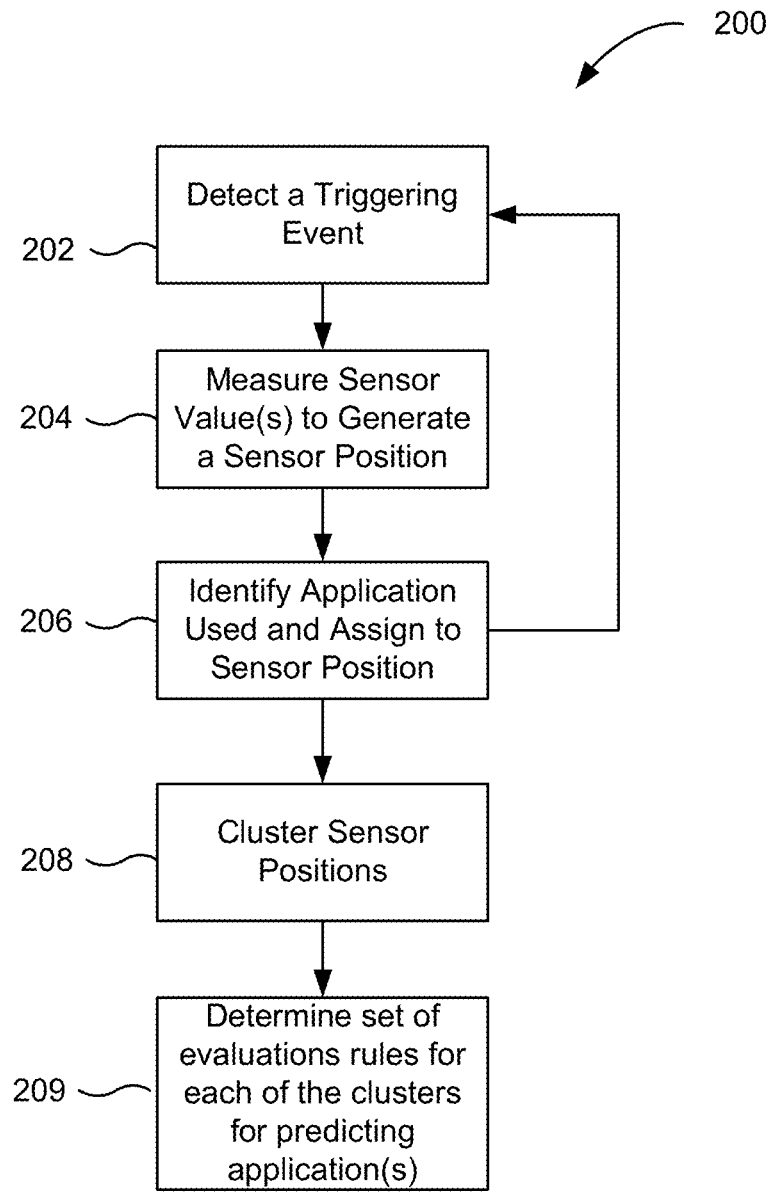
FIG. 2A is a flowchart of a method for generating clusters of sensor positions.

FIG. 2A is a flowchart of a method 200 for generating clusters of sensor positions. The clusters of sensor positions may be later used by a mobile device to identify and suggest an application to a user. Method 200 can be performed by a mobile device, e.g., a phone, tablet, wearable computing device, and the like.

At block 202, a triggering event is detected. A triggering event can be identified as an event sufficiently likely to correlate to an operation of the mobile device. A triggering event can be caused by a user and/or an external device. For instance, the triggering event can be a specific interaction of the user with the mobile device. The specific interaction can be used to learn what the user does at a particular position, and thus can be considered a learning triggering event. Examples of learning triggering events are application launches, specific activity within an application (e.g., making a selection within the application), voice commands (e.g., to initiate at voice assistant to perform searching or other activity with an application), and a first interaction of the day. As other examples, a triggering event can be when an accessory device is connected to the mobile device, e.g., inserting headphones into a headphone jack, making a Bluetooth connection, and the like. A list of events that are triggering events can be stored on the mobile device. Such events can be a default list and be maintained as part of an operating system, and may or may not be configurable by a user.

At block 204, one or more sensor values are measured by one or more sensors of the device to generate a sensor position (e.g., sensor position 132 in FIG. 1A) in the form of a data point (e.g., a multi-dimensional data point or a single-dimensional data point). The sensor position is measured at a physical position in physical space. The sensor values may correspond to one or more signal properties of a signal (e.g., signals 100 and 101 in FIG. 1A) emitted from one or more signal sources (e.g., signal sources 102A and 102B in FIG. 1A). For example, the sensor values may be values corresponding to signal strengths of measured signals, such as received signal strength indication (RSSI) values or any other suitable signal property whose value changes with respect to a distance of separation from a signal's point of origin. In other cases, the sensor values may include signal properties indicative of a distance between the device and the signal's point of origin, such as a time-of-flight (TOF) measurement value. As an example, the one or more sensors can include one or more antennas and associated circuitry to measure properties of a signal. Other examples of sensors include light sensors or audio sensors.

A signal source may be any suitable device configured to emit wireless signals. For example, a signal source may be an access point such as a wireless router, a Bluetooth device, or any other networking device suitable to transmit and/or receive signals (e.g., Bluetooth speakers, refrigerators, thermostats, home automation portals, etc.). Different signal sources can be identified based on an identifier in the signal. Each measurement from a different device can correspond to a different sensor value.

Even if a signal from only one signal source is measured, the data point representing the location can still have multiple dimensions. For example, multiple measurements can be made of signals from the same signal source, with each measurement corresponding to a different dimension of the data point (e.g. measurements of different signal properties of the signal). Additional dimensions can correspond to other devices, even if signals are not detected at a given location. Non-detected devices can have a sensor value of zero assigned, thereby still having a value for those dimensions.

At block 206, the device identifies an application used at the time the sensor value(s) are measured. The identified application may be assigned to the corresponding sensor position. A correlation between a sensor position and an application may be determined when the application is used multiple times at the sensor position or nearby sensor positions (e.g., as part of a same cluster). This correlation can be used to predict which application the user will likely use when a given sensor position is measured.

An application may correspond to any software executed on a processor of a device. For example, an application can be a client application that is executed by an operating system (e.g., electronic recipe software or software to read ebooks). As another example, an application can be software that is part of the operating system (e.g., a daemon).

Once an application has been identified, method 200 may loop back and detect an occurrence of another triggering event at block 202. In which case, method 200 may once again measure sensor values to generate a sensor position at block 204 and identify another application used at the sensor position at block 206. Blocks 202, 204, and 206 may be performed many times to gather numerous recordings of various sensor positions and the associated applications.

At block 208, the numerous recordings of various sensor positions may be analyzed to form clusters of sensor positions. The sensor positions may be analyzed at night when the user is asleep or not planning on using the mobile device for an elongated period of time, e.g., at least 4 hours. The analysis may be a batch analysis performed on a plurality of sensor positions stored from use of the mobile device across several days or weeks. A cluster of sensor positions can correspond to a group of sensor positions that are near each other in sensor space. For example, the sensor positions of a cluster can have data points that are within a threshold distance of each other or from a centroid of a cluster. Sensor positions of a cluster in sensor space would typically have their corresponding physical positions form a cluster in physical space.

As shown in FIG. 1A, physical positions 104, 106, 108, and 110 may be grouped into clusters 114 and 116 based on having similar sensor values. As an example, physical positions 104 and 106 may be grouped within cluster 114 because the sensor values for physical position 104 are within a threshold distance to the sensor values for physical position 106. Likewise, physical positions 108 and 110 may be grouped within cluster 116 because the sensor values for physical position 108 may be within a threshold distance to the sensor values for physical position 110. However, sensor values for sensor positions in cluster 114 may be different than the sensor values for sensor positions in cluster 116, thereby resulting in a separation between clusters 114 and 116. The threshold distance may be defined by typical use of the device in physical space, e.g., widths of a few feet. A threshold distance in physical space can correlate to a sensor distance based on a mapping function that can be determined via a calibration process, which may be performed by a manufacturer of the mobile device. Further details of a threshold distance can be found in concurrently filed application entitled "Determining Location of Mobile Device Using Sensor Space to Physical Space Mapping," which is incorporated by reference in its entirety.

Because the device has identified the application run by the device at the various sensor positions, one or more applications may be associated with each cluster of sensor positions. For example, if the user runs a food-related application at sensor position 132, then the food-related application may be associated with cluster 124. Cluster 124 may be associated with a physical location, such as a kitchen of a home (e.g., physical location 114). However, the device may not typically know the association between cluster 124 and the kitchen. The device may only know that cluster 124 is associated with the food-related application. Different applications may be associated with the same cluster, which may result in applications with different probabilities of being run by the user, where such probabilities can be used in determining an action to be performed with one or more of the applications, e.g., using a set of one or more evaluation rules.

At block 209, a set of one or more evaluations rules are optionally determined for each of the clusters based on historical interactions of a user with the mobile device. The evaluation rule(s) for a cluster can be determined based on how many times a particular application was run within that cluster, thereby determining which application(s) are run the most and potentially which actions are most likely to be performed by the application(s). The evaluation rules can be optionally performed once the clustering is performed so as to minimize processing time when the clusters are used as part of determining a predicted application in response to a detected event. Alternatively, the evaluation rules can be performed at a later, e.g., when an event is detected. The determination can be made by a prediction model, as is discussed in more detail below.

B. Performing Proactive Action Based on Measured Sensor Position and Clusters

Once the clusters have been determined and potentially after a prediction model has been run, the mobile device can be used in a mode that allows a predicted application to be identified based on measured sensor values. Even while predictions are made, sensor positions and associated application can be determined on an ongoing basis, with the clustering and any updates to a prediction model being performed periodically.

Figure 2B:
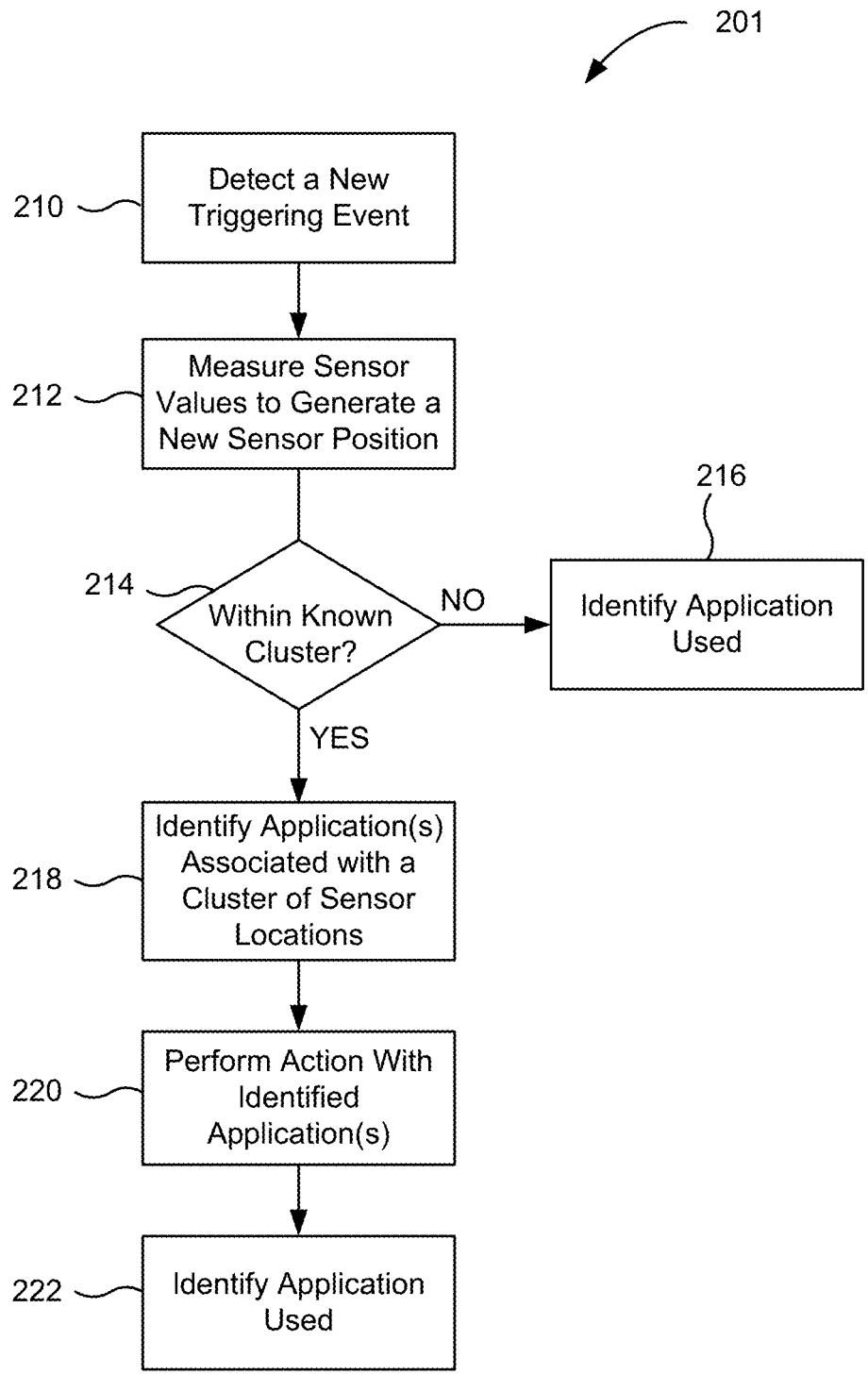
FIG. 2B is a flowchart of a method for identifying an application based upon a sensor position.

FIG. 2B is a flowchart of a method 201 for suggesting an application to a user by referencing clusters of sensor positions. At block 210, a new triggering event is detected. Detection of the new triggering event may be similar to the detection of the triggering event discussed with reference to block 202 in FIG. 2A, but the new triggering event may occur at a later time and a different physical position. This new physical position may be in a cluster of physical positions corresponding to a cluster of previous sensor measurements.

In some cases, the new triggering event is a prediction triggering event, which is used to detect when to make a prediction of action that might be taken with an application on the mobile device, as opposed to just an event to learn what the user does. As an example, the user can press a button or touch a touch-sensitive display screen to cause a backlight of the mobile device to turn on, such as pushing a home button, thereby indicating that the user intends to interact with the mobile device. In such examples, the turning on of the backlight may be the triggering event. Other examples of triggering events include the user moving around substantially while on lock screen or home screen. Some prediction triggering events can also be learning triggering events.

At block 212, one or more sensor values are measured by the mobile device to generate a new sensor position. Generating the new sensor position may also be similar to generating the sensor position discussed with reference to block 204.

At block 214, it is determined whether the new sensor position is located within a known cluster of sensor positions. The new sensor position may be determined to be within a known cluster of sensor positions if it is within a threshold distance to a centroid of the known cluster of sensor positions. If the new sensor position is not within a known cluster of sensor positions, then at block 216, an application may be identified if an application is used in conjunction with the new triggering event. For example, a sensor position 128 corresponding to physical position 118 in FIG. 1A may not be within a threshold distance to clusters 124 or 126. Thus, the mobile device may record sensor position 128 and identify the associated application run by the user at sensor position 128 for future reference. But, a specific action may not be taken, as a cluster had not been identified for that position.

If, however, the new sensor position is within a known cluster of sensor positions, then at block 218, an application corresponding to the known cluster is identified. If the new sensor position is positioned within a threshold distance to a cluster of sensor positions, then one or more applications associated with that cluster of sensor positions may be identified. The one or more applications may be determined using one or more evaluation rules that are generated at the time of measuring the sensor position or at a previous time, e.g., right after clustering.

As an example, referring back to FIG. 1A, physical position 112 may correspond with sensor position 134. Sensor position 134 may be positioned to be within a threshold distance to cluster 124. Accordingly, the application associated with cluster 124 may be identified for sensor position 134. If continuing with the example discussed with respect to block 208, the application identified for sensor position 134 may be the food-related application. As mentioned herein, the mobile device may not know that clusters 124 and 126 are associated with a physical location in a home, such as a kitchen or a bedroom. Rather, the mobile device may only know that the measured sensor positions form groups of sensor positions, as shown in FIG. 1B, and may associate each group of sensor position with a discrete location.

At block 220, an action is performed in association with the application. The action may be the providing of a message including or using the identified application, such as a notification including the application. For example, the message may be a user interface that allows a user to select to run the application. The user interface may be provided in various ways, such as by displaying on a screen of the mobile device, projecting onto a surface, or providing an audio interface. A particular user interface provided to the user may depend on a degree of probability of being performed by the user. For instance, the higher the probability of use (e.g., based on higher instances of such use), more aggressive action can be taken, such as automatically opening an application with a corresponding user interface (e.g., visual or voice command), as opposed to just providing an easier mechanism to open the application (e.g., an icon on lock screen). In some implementations, if a probability is too low for any application, then no action may be taken.

A "message" may correspond to data in any form of communication, which may be provided to a user (e.g., displayed) or provided to another device. A message can be generated by an application or include information related to an application running on a device (e.g., include a link to an application). As examples, a message may be an alert, notification, suggested application, and the like. A message does not necessarily have to include text that conveys a readable message, as the message can be to another application, and thus the message can be in binary form.

At block 222, an application is identified. The application may be the same application identified at block 218, thereby reinforcing the identification of the application and the action taken, or a different application run by a user, e.g., even after the message is provided to the user. Thus, even if the sensor position is within a cluster, an identification can be made of an application used, as further iterations of clustering and updating of evaluation rules of a prediction model can be performed on an ongoing basis. The performance of block 222 is an example of a prediction triggering event also being used as a learning triggering event. Alternatively, block 222 may be performed in response to a different learning triggering event (e.g., an application launch as opposed to a home button press), where the new sensor position can be re-used, as opposed to performing a new measurement.

Method 201 can enable a mobile device to accurately predict an application for a user at specific locations within a place where location information (e.g., information from GPS, Global Navigation Satellite System (GLONASS), Bei-Dou, Galileo, and wireless fidelity (Wi-Fi) based positioning) is nonexistent or unreliable or, where spatial resolution of existent location information is too large. As an example, method 201 can allow a mobile device to predict the food-related application when the mobile device is positioned in a kitchen of a user's home without knowing that the mobile device is positioned in the kitchen of the user's home, and can allow the mobile device to predict another application, such as a news-related application, when the mobile device is positioned in the user's bedroom without knowing that the mobile device is positioned in the bedroom of the user's home.

In another example, method 201 can allow a mobile device to send a message or a reminder to a user when the mobile device detects that it is positioned in a specific location. For instance, method 201 may allow the mobile device to send a correct meeting location when the mobile device is positioned in a wrong conference room. In another instance, method 200 may allow the mobile device to send a reminder to call a client when the mobile device enters the user's office, e.g., when the user accessed the mobile device. As such, performing method 201 enables the mobile device to be more user friendly and have a deeper connection with the user.

III. Events Triggering Prediction

Prediction triggering events may be a predetermined set of events that trigger the identification of one or more applications to provide to a user. The events may be detected using signals generated by device components. Examples of prediction triggering events are discussed above. The description below may also apply to other triggering events.

Figure 3:
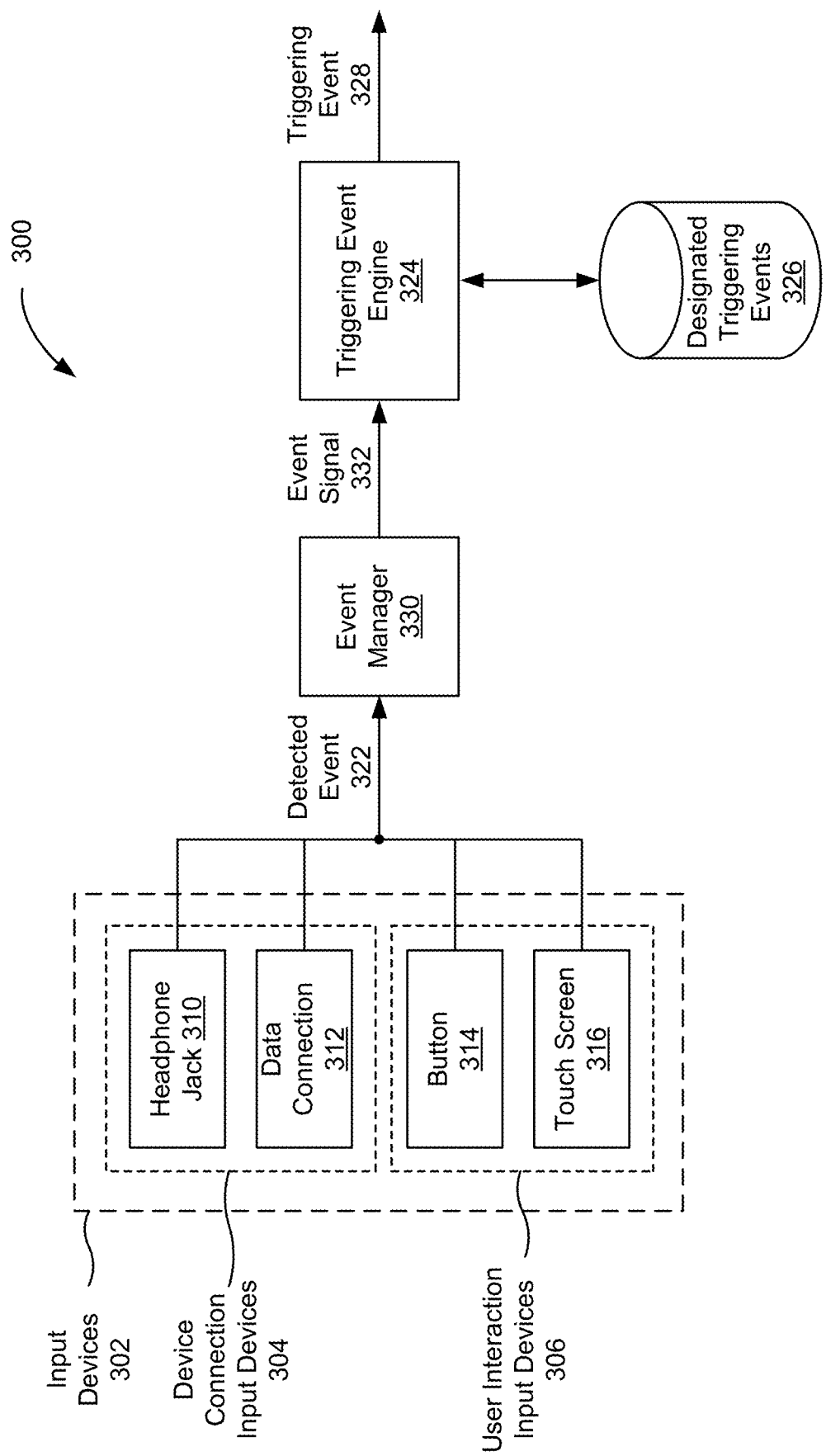
FIG. 3 shows a block diagram of a system for determining a triggering event.

FIG. 3 illustrates a simplified block diagram of a detection system 300 for determining a triggering event. Detection system 300 may reside within the device for which a triggering event (also just called an "event") is being determined. As shown, detection system 300 can detect a plurality of different events. One or more of the detected events may be determined by detection system 300 to be triggering events. Other processing modules can then perform processing using the triggering event.

A. Detecting Events

The detection system 300 includes hardware and software components for detecting events. As an example, detection system 300 may include a plurality of input devices, such as input devices 302. Input devices 302 may be any suitable device capable of generating a signal in response to an event. For instance, input devices 302 may include device connection input devices 304 and user interaction input devices 306 that can detect device connection events (e.g., headphone jack, Bluetooth device, Wi-Fi connection, and the like) and user interaction events (e.g., buttons, switches, latches, touch screens, and the like), respectively. When an event is detected at an input device, the input device can send a signal indicating a particular event for further analysis.

1. User Interaction Events

User interaction input devices 306 may be utilized to detect user interaction events. User interaction events can occur when a user interacts with the device. Any suitable device component of a user interface can be used as a user interaction input device 306. A "user interface" can correspond to any interface for a user to generally interact with a mobile device or to interact with a specific application. Examples of suitable user interaction input devices are a button 314 and a touch screen 316. Button 314 of a mobile device may be a home button, a power button, volume button, and the like. In some cases, any input device that turns on a backlight of the mobile device may be a user interaction input device 306. When the user interacts with the device, it may be determined that a user has provided user input, and a corresponding user interaction event may be generated.

Touch screen 316 may allow a user to provide user input via a display screen. For instance, the user may swipe his or her finger across the display to generate a user input signal. When the user performs the action, a corresponding user interaction event is detected.

User interaction events can also include user actions within an application. For example, in a home application, a user's selection of an accessory device (e.g., turning on a room light, opening a garage door, and the like) can be a user interaction event. The user can select the accessory device via a touch screen or via voice commands.

2. Device Connection Events

Device connection events may be events that occur when other devices are connected to the device. For example, device connection input devices 304 can detect events where devices are communicatively coupled to the device. Any suitable device component that forms a wired or wireless connection to an external device can be used as a device connection input device 304. Examples of device connection input device 304 include a headphone jack 310 and a data connection 312, such as a wireless connection circuit (e.g., Bluetooth, Wi-Fi, Bluetooth Low Energy or BLE, and the like) or a wired connection circuit (e.g., Ethernet and the like).

The headphone jack 310 allows a set of headphones to couple to a device. A signal can be generated when headphones are coupled, e.g., by creating an electrical connection upon insertion into headphone jack 310. In more complex cases, headphone jack 310 can include circuitry that provides an identification signal that identifies a type of headphone jack to the device. The event can thus be detected in various ways, and a signal can be generated and/or communicated in various ways.

Data connection 312 may communicatively couple with an external device, e.g., through a wireless connection. For instance, a Bluetooth connection may be coupled to a computer of a vehicle, or a computer of a wireless headset. Accordingly, when the external device is coupled to the mobile device via data connection 312, it may be determined that an external device is connected, and a corresponding device connection event signal may be generated. As another example, when a beacon communication via BLE is received, it may be determined that an external device is connected. When an accessory device (e.g., a smart lock, a room light) is controlled via a wireless connection, it may also be determined that an external device is connected.

B. Determine Triggering Events

As further illustrated in FIG. 3, input devices 302 can output a detected event 322, e.g., as a result of any of the corresponding events. Detected event 322 may include information about which input device is sending the signal for detected event 322, a subtype for a specific event (e.g., which type of button is pressed). Such information may be used to determine whether detected event 322 is a triggering event, and may be passed to later modules for determining which predictor module to use to determine which application to suggest, what message should be sent, or which action to perform.

Detected event 322 may be received by an event manager 330. Event manager 330 can receive signals from input devices 302, and determine what type of event is detected. Depending on the type of event, event manager 330 may output signals (e.g., event signal 332) to different engines.

The different engines may have a subscription with the event manager 330 to receive specific event signals 332 that are important for their functions. For instance, triggering event engine 324 may be subscribed to receive event signals 332 generated in response to detected events 322 from input devices 302. Event signals 332 may correspond to the type of event determined from the detected events 322.

Triggering event engine 324 may be configured to determine whether the detected event 322 is a triggering event, and potentially the type of triggering event. To make this determination, triggering event engine 324 may reference a designated triggering events database 326, which may be coupled to the triggering event engine 324. The designated triggering events database 326 may include a list of predetermined events that are designated as triggering events, and potentially what type of triggering event each is.

Triggering event engine 324 may compare the received detected event 322 with the list of predetermined events and output a triggering event 328 if the detected event 322 matches a predetermined event listed in the designated triggering events database 326. An example of the list of predetermined events may include pressing the power button, pressing the home button, or performing any other action that turns on a backlight of the mobile device, indicating that a user wishes to interact with the mobile device to perform an action or run an application.

C. Identify Application(s) and Perform Associated Action(s)

Once a triggering event is detected, an application may be identified based on the triggering event. In some cases, identification of the application is not a pre-programmed action. Rather, identification of the application can be a dynamic action that may change depending on additional information. For instance, identification of the suggested application can be determined based on contextual information.

"Contextual information" refers collectively to any data that can be used to define the context of a mobile device. The contextual information for a given context can include one or more contextual data, each corresponding to a different property of the mobile device. The potential properties can belong to different categories, such as a time category (e.g., time information) or a location category. Contextual data can be used as a feature of a model (or sub-model), and the data used to train the model can include different properties of the same category. A particular context can correspond to a particular combination of properties of the mobile device, or just one property.

Figure 4:
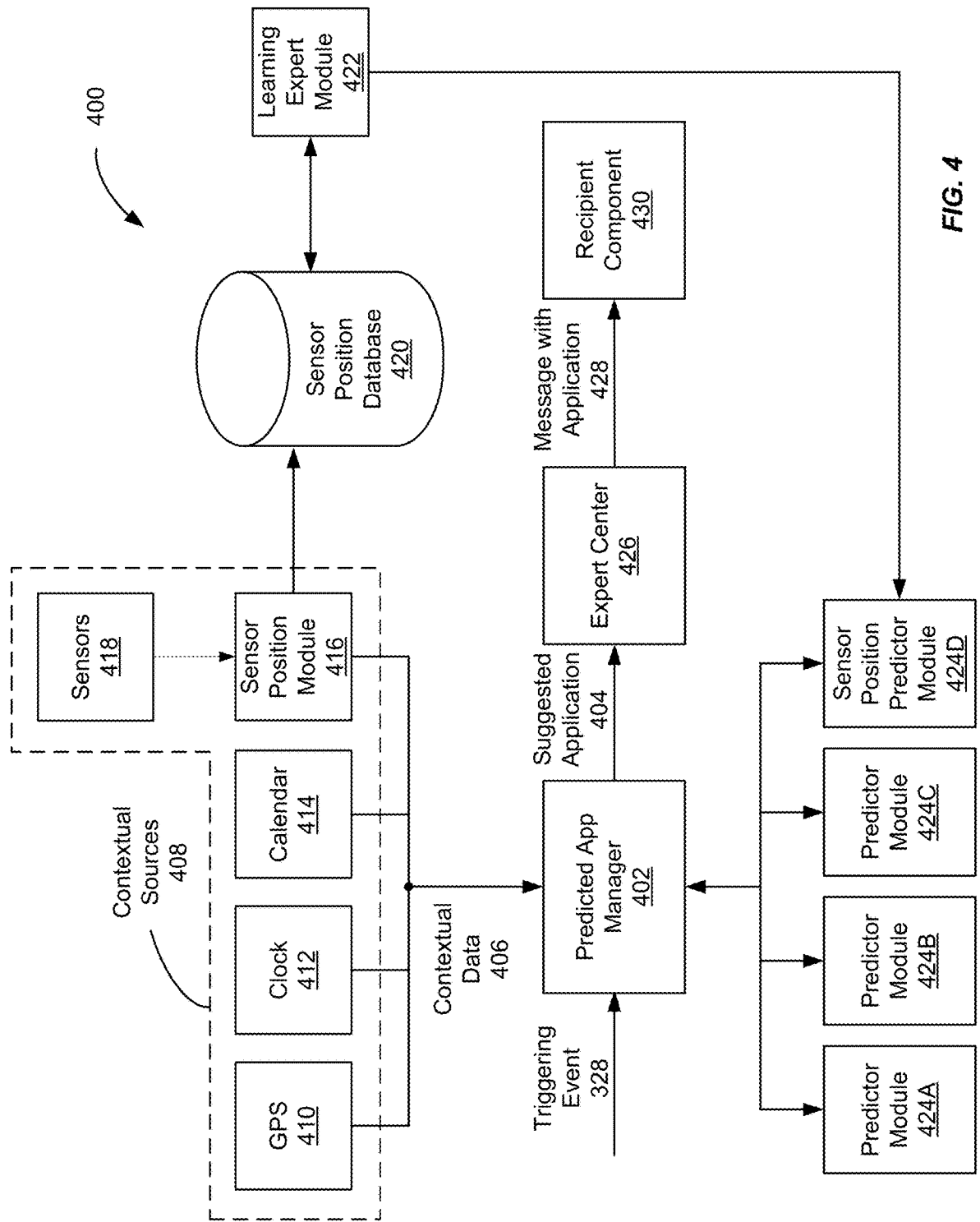
FIG. 4 shows a block diagram of a system for identifying an application for a user based on a sensor position.

FIG. 4 illustrates a simplified block diagram of a prediction system 400 for identifying an application and a corresponding action based upon a triggering event and contextual information. Prediction system 400 resides within the mobile device that is identifying the application. Prediction system 400 may include hardware and software components.

Prediction system 400 includes a predicted app manager 402 for identifying the suggested application. Predicted app manager 402 can receive a triggering event, such as the triggering event 328 discussed in FIG. 3. The predicted app manager 402 may use information gathered from the triggering event 328 to identify a suggested application 404. As shown, predicted app manager 402 may receive contextual data 406 in addition to the triggering event 328.

1. Contextual Information

Contextual information may be gathered from contextual data 406 and may be received at any time. For instance, contextual information may be received before and/or after the triggering event 328 is detected. Additionally, contextual information may be received during detection of the triggering event 328. Contextual information may specify one or more properties of the mobile device for a certain context. The context may be the surrounding environment (type of context) of the mobile device when the triggering event 328 is detected. For instance, contextual information may be the time of day the triggering event 328 is detected. In another example, contextual information may be a certain location of the mobile device when the triggering event 328 is detected. In yet another example, contextual information may be a certain day of year at the time the triggering event 328 is detected. Additionally, contextual information may be data gathered from a calendar. For instance, the amount of time (e.g., days or hours) between the current time and an event time. Such contextual information may provide more meaningful information about the context of the mobile device such that the predicted app manager 402 may accurately suggest an application that is likely to be used by the user in that context. Accordingly, predicted app manager 402 utilizing contextual information may more accurately suggest an application to a user than if no contextual information were utilized.

Contextual data 406 may be generated by contextual sources 408. Contextual sources 408 may be components of a mobile device that provide data relating to the current context of the mobile device. For instance, contextual sources 408 may be hardware devices and/or software code that operate as an internal digital clock 410, GPS device 412, calendar 414, and a sensor position module 416 for providing information related to time of day, location of the mobile device, and day of year, and a sensor position of the mobile device respectively. Other contextual sources may be used.

Sensor position module 416 may be software code configured to receive information from sensors 418 and write data to a sensor position database 420. The sensor position module 416 may receive measurements of sensor values from sensors 418 and store the measured values as a sensor position in an entry in sensor position database 420. Sensors 418 may be a hardware component that is configured to detect transmission signals, such as Wi-Fi signals, Bluetooth signals, radio frequency (RF) signals, and any other type of signal capable of transmitting information wirelessly. Sensor position module 416 may be coupled to a sensor position database 420 to store the detected sensor values for future reference by a learning expert module 422, as will be discussed further herein. Sensor position module 416 may then use the measured sensor values to output a sensor position to predicted app manager 402 as contextual data.

2. Predictor Modules for Determining Recommendation

Predicted app manager 402 may then use information gathered from both the triggering event 328 and contextual data 406 to identify a suggested application 404. Predicted app manager 402 may also determine an action to be performed, e.g., how and when a message including or using suggested application 404 is provided, as may occur by a user interface be provided for a user to interact with suggested application 404.

Predicted app manager 402 may be coupled to several predictor modules 424A-424D to identify the suggested application 404. Each predictor module 424A-424D may be configured to receive information from predicted app manager 402 and output a prediction back to predicted app manager 402. The information sent to predictor modules 424A-424D may include triggering event 328 and any relevant contextual data 406, and the prediction output to predicted app manager 402 may include one or more applications and their corresponding confidence value representing how likely the user will run the application based upon the received information.

Predictor modules 424A-424D may be configured for different purposes. For instance, predictor modules 424A-242D may be configured to predict an application based on a triggering event, predict an action for controlling an accessory of a home, predict an application that is not currently installed on a mobile device that a user may be interested in, and predict an application based upon a sensor position (i.e., sensor position predictor module 424D). Depending on which types of triggering events are detected, predicted app manager 402 may send the information to only those predictor modules. Thus, predicted app manager 402 may send information to one predictor module, a subset of predictor modules 424A-424D, or all predictor modules 424A-424D.

Each predictor module may have a set of one or more evaluation rules for determining a prediction (e.g., application(s) and action(s)) to send to predicted app manager 402. The set of evaluation rules for sensor position predictor module 424D can comprise a list of one or more applications that correspond to a sensor position or a cluster of sensor positions, along with one or more criteria and actions to be taken for the one or more applications. An evaluation rule can select one or more applications based on the one or more criteria. For example, a likelihood (e.g., a confidence value) of each of the applications can be provided, and a criterion can be to provide the top 5 most likely applications on a screen of a user interface, where such display can comprise a message. The set of evaluation rules can further include the confidence values of the application(s) in the list. The one or more criteria can include a predetermined set of contextual information that, when measured upon detection of a triggering event, indicate which of the applications in the list that are likely to be accessed by a user Each set of evaluation rules may be a set of strings stored in memory or code compiled as part of an operating system. When predictor modules 424A-424D receive information from predicted app manager 402, predictor modules 424A-424D may compare the received information to the evaluation rules and output the predicted application and confidence that best fit the received information. As an example, sensor position predictor module 424D may have a set of evaluation rules establishing that if the sensor position is within cluster 1, then the likelihood of the user running the food-related application is at a confidence value of 90%; and if the sensor position is within cluster 2, then the likelihood of the user running the news-related application is at a confidence value of 80%.

Although the example discusses considering the sensor position of the mobile device, other contextual data 406 may also be considered to determine a predicted application and its corresponding confidence value. For instance, time of day and day of the week may also influence the prediction determined by predictor modules 424A-424D.

Once predicted app manager 402 receives the predicted application from predictor modules 424A-424D, the predicted app manager 402 may send the suggested application 404 to an expert center 426. The expert center 426 may be a section of code that manages what is displayed on a mobile device, e.g., on a lock screen, when a search screen is opened, or other screens. For instance, the expert center 426 may coordinate which information is displayed to a user, e.g., a suggested application, suggested contact, and/or other information. Expert center 426 can also determine how to provide such information to a user. As aforementioned herein, a particular user interface provided to the user may depend on a degree of probability of being performed by the user. The higher the probability of use, more aggressive action can be taken, such as automatically opening an application with a corresponding user interface (e.g., visual or voice command), as opposed to just providing an easier mechanism to open the application.

If the expert center 426 determines that it is an opportune time for the suggested application (or a message generated by the suggested application) to be output to the user, e.g., when the user has not yet run an application on the mobile device but is actively interacting with the mobile device, the expert center 426 may output a message 428 with suggested application 404 to a recipient component 430. Recipient component 430 may be a user interface of the mobile device itself, or a user interface of another device, such as a tablet, laptop, smart watch, smartphone, or other mobile device. As another example, recipient component 430 may be another application on the mobile device or an application of another device, where the application may be an operating system (e.g., in firmware) of the other device, as may occur when a command message is sent to another device to perform an action. In cases where suggested application 404 is included in message 428, recipient component 430 (e.g., a user interface) may communicate the suggested application 404 to the user and solicit a response from the user regarding the suggested application 404.

Recipient component 430 may require different levels of interaction in order for a user to run the suggested application 404. The various levels may correspond to a degree of probability that the user will run suggested application 404. For instance, if the predicted app manager 402 determines that suggested application 404 has a probability of being run by the user that is greater than a threshold probability, recipient component 430 may output a prompt that allows the user to more quickly run the application by skipping intermediate steps.

Alternatively, if predicted app manager 402 determines that the probability of the user running the identified application is less than the high threshold probability, but still higher than a lower threshold probability, the identified application may be displayed as an icon. The lower threshold probability may be higher than a baseline threshold probability. The baseline threshold probability may establish the minimum probability at which a corresponding application will be suggested. The user may thus have to perform an extra step of clicking on the icon to run the identified application. However, the number of clicks may still be less than the number of clicks required when no application is suggested to the user. The threshold probability may vary according to application type. In some cases, the high threshold probability may range between 75% to 100%, the lower threshold probability may range between 50% to 75%, and the baseline threshold may range between 25% to 50%. In an example, the high threshold probability is 75%, the lower threshold probability is 50%, and the baseline probability is 25%.

In some cases, higher probabilities may result in more aggressive application suggestions. For instance, if an application has a high probability of around 90%, predicted app manager 402 may provide an icon on a lock screen of the mobile device to allow the user to access the application with one click of the icon. If an application has an even higher probability of around 95%, predicted app manager 402 may even automatically run the suggested application for the user without having the user click anything. In such instances, predicted app manager 402 may not only output the suggested application, but also output a command specific to that application, such as a command to open the first article in the news-related application or a command to query the user to accept or decline initiating a set of predetermined actions.

In some cases, predicted app manager 402 may determine what level of interaction is required, and then output that information to expert center 426. Expert center 426 may then send this information to recipient component 430 to output to the user.

In some cases, recipient component 430 may display a notice to the user on a display screen. The notice may be sent by a system notification, for instance. The notice may be a visual notice that includes pictures and/or text notifying the user of the suggested application. The notice may suggest an application to the user for the user to select and run at his or her leisure. In some cases, for more aggressive predictions, the notification may also include a suggested action within the suggested application. That is, a notification may inform the user of the suggested application as well as a suggested action within the suggested application. The user may thus be given the option to run the suggested application or perform the suggested action within the suggested application. As an example, a notification may inform the user that the suggested application is the news-related application and the suggested action is to access the first article within the news-related application. The user may indicate that he or she would like to read the first article by clicking on an icon indicating the first article. Alternatively, the user may indicate that he or she would rather run the application to read another article by swiping the notification across the screen.

In some cases, the mobile device may identify what application is run at a sensor position, and then draw an association between the sensor position and the application. The application may be stored in sensor position database 420 along with the corresponding sensor position. In some cases, sensor position database 420 may store sensor position data during a certain period of time. As an example, sensor position database 420 may store sensor position data measured during the last seven weeks. Knowing which application is run at the sensor position helps evaluate the user's habits to update the evaluation rules stored in sensor position predictor module 424D for use in predicting applications in line with the user's habits. In some cases, an expert module can routinely update predictor modules 424A-424D.

3. Updating Controllers for Determining Recommendation

As shown in FIG. 4, a learning expert module 422 is coupled to sensor position database 420 and sensor position predictor module 424D. Learning expert module 422 may be configured to update a set of evaluation rules contained in sensor position predictor module 424D. Although FIG. 4 only shows one learning expert for updating one predictor module, techniques are not so limited. For instance, learning expert module 422 can also be configured to update any of predictor modules 424A-424C. In other instances, additional learning experts may be implemented in prediction system 400 for updating predictor modules 424A-424C.

Learning expert module 422 may be a software module configured to access sensor position database 420 and analyze its stored information to generate an updated set of evaluation rules for sensor position predictor module 424D. Learning expert module 422 may include one or more prediction models (not shown). Each prediction model may be a section of code and/or data that is specifically designed to identify an application for a specific triggering event. For instance, one prediction model may be specifically designed to identify an application for a triggering event associated with a turning on of a backlight of the mobile device. Each prediction model may be coupled to the contextual sources so that each prediction model may utilize contextual information to identify a suggested application. Examples of prediction models include neural networks, decision trees, multi-label logistic regression, and combinations thereof, and other types of supervised learning. Further details can be found in U.S. patent application Ser. Nos. 14/732,359 and 14/732,287, which are incorporated by reference in their entirety.

As mentioned herein, sensor position database 420 may store sensor position data for a specific period of time, e.g., the past seven weeks of use. Thus, the updated set of evaluation rules generated by learning expert module 422 for sensor position predictor module 424D may reflect the pattern of device usage across the past seven weeks. In some cases, once learning expert module 422 has generated an updated set of evaluation rules, learning expert module 422 may be deleted and removed from memory. Next time the sensor position predictor module 424D is updated, learning expert module 422 may be initiated again to generate an updated set of evaluation rules and then deleted once again. Deleting learning expert module 422 after generating an updated set of evaluation rules saves memory space and increases device performance.

In some cases, learning expert module 422 may be periodically run. The time at which learning expert module 422 is run may depend on the availability of the mobile device and the likelihood of being used by the user. As an example, learning expert module 422 may be run every night when the user is asleep, e.g., after sensor position module determines clusters of sensor positions. In such instances, the mobile device is typically connected to a power source to charge its battery and the user is not likely to access the mobile device and interrupt the operations of learning expert module 422.

IV. Possible Issues with Unsupervised Machine Learning for Microlocation

Some embodiments can use microlocation data inside a physical area (e.g., a home, an office, and the like) for suggesting applications, actions, and/or accessory devices on a mobile device. As part of a learning process, embodiments can collect a large number of untagged samples sporadically over a period of time (e.g., a day, a week, a month, and the like) as a user performs various actions using the mobile device (e.g., opening emails, open a video streaming service (e.g., YouTube), turning on lights, etc.) around the physical area as his day-to-day routine. Each sample includes a data point that comprises one or more sensor values. Each data point can be associated with an application or an accessory device, e.g., a based on what application or accessory device was used at the time of the measurement of the data point or at a proximal time. An unsupervised machine learning model can generate a plurality of discrete clusters of data points from the sample set (e.g., by using a threshold distance among the data points). When a new data point is measured, the machine learning model can determine that the new data point corresponds to a particular cluster of the plurality of clusters, and identify an application or an accessory device associated with the particular cluster, which can be provided to the user on the mobile device.

Figure 5:
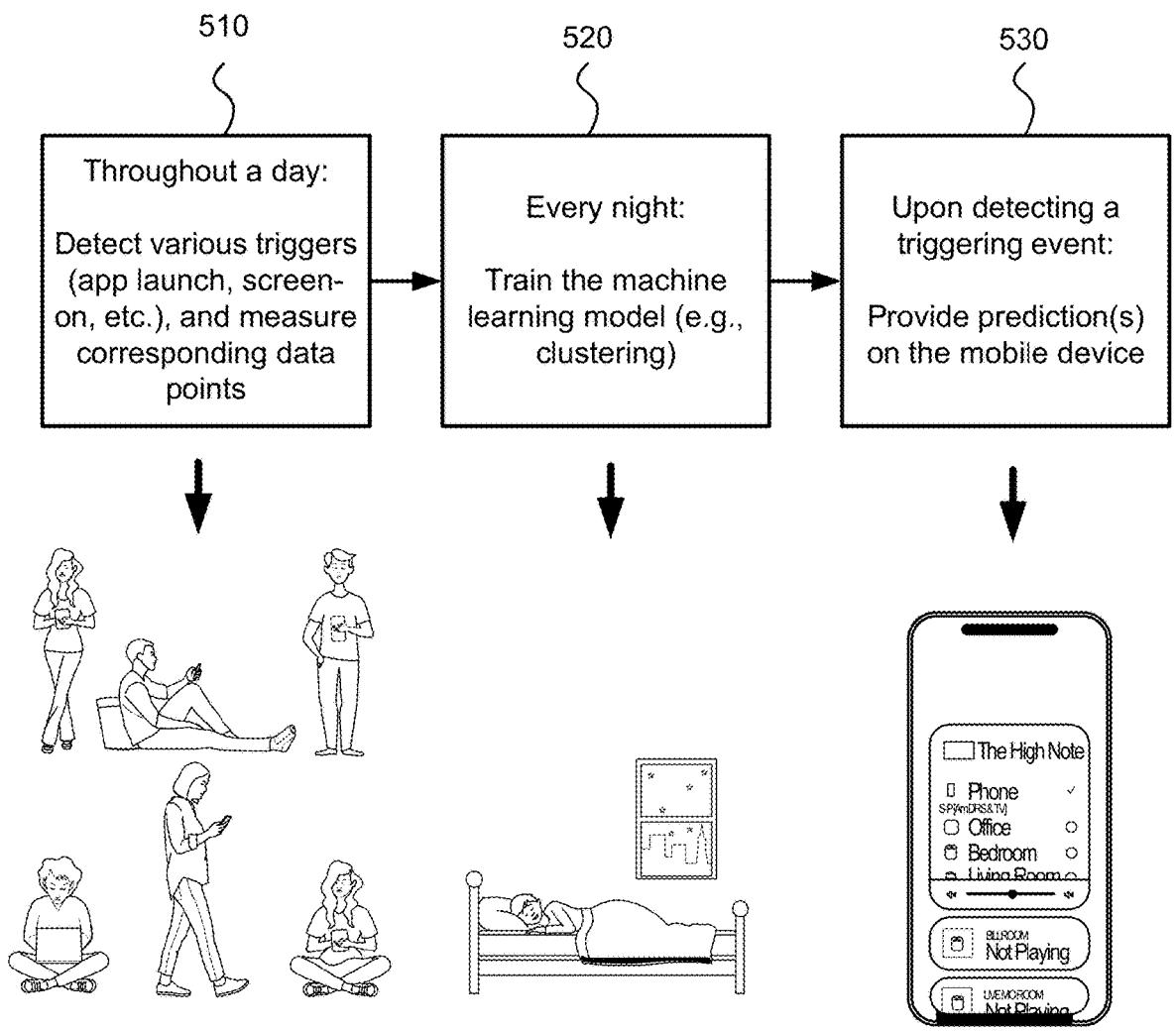
FIG. 5 illustrates an example of microlocation using unsupervised machine learning.

A. Predicting Targets Based on Microlocation Using Unsupervised Machine Learning FIG. 5 illustrates an example of predicting targets based on microlocation using unsupervised machine learning. At 510, a mobile device can detect various triggering events throughout a day as a user performs various actions around the home in his daily routine using a mobile device. The triggering events can be, for example, launching an application, turning on the screen, plugging in the earphone, controlling an accessory device, and the like. Upon detecting a triggering event, the mobile device can obtain a data point corresponding to the location at which the triggering event is detected, by measuring one or more sensor values from one or more signals emitted by one or more signal sources located within the home. Thus, many samples collected sporadically throughout the day can be saved. The samples have no labels as they do not have any location context. Such samples may be referred to herein as untagged samples.

At 520, the untagged samples that have been collected and saved throughout the day can be used to train a machine learning model at night. The machine learning model can identify a plurality of discrete clusters of data points in the sensor space. Each cluster in the sensor space can correspond to a cluster in the physical space (e.g., as discussed above in section I). For example, one cluster may correspond to the bedroom, another cluster may correspond to the living room, and so on and so forth. The training can be performed every night, every week, every month, or the like. The machine learning model determines how many clusters and assigns untagged samples to generate clusters' boundaries. This type of machine learning may be referred to as unsupervised machine learning.

Once the machine learning model has been trained, at 530 upon detecting a new triggering event, the mobile device can obtain a new data point by measuring one or more sensor values. The machine learning model can use the new data point as an input, and determine that the new data point corresponds to a particular cluster of the plurality of clusters. The machine learning model can then predict one or more targets associated with the particular cluster. The predicted targets can be for example, applications (e.g., email, video streaming, and the like) and/or accessory devices (e.g., bedroom light, thermostat, and the like). The predicted targets can be provided to the user on the screen of the mobile device. For example, the machine learning model can "learn" that the user usually opens the video streaming app at cluster A. Thus, if the new data point is identified to correspond to cluster A, the video streaming app can be provided on the screen of the mobile device.

B. Possible Issues with Microlocation Using Unsupervised Machine Learning

In the unsupervised learning approach for microlocation, one may hope that the clusters generated by the machine learning model correspond to the desired target areas. For example, the desired target areas may include various rooms in the home, such as the bedroom, the sofa, the child's room, the kitchen, and so on. However, the unsupervised machine learning model may not always produce the desired outcome. For example, clusters can sometimes correspond to overlapping rooms, or there can be multiple clusters in the same room.

Figure 6A:
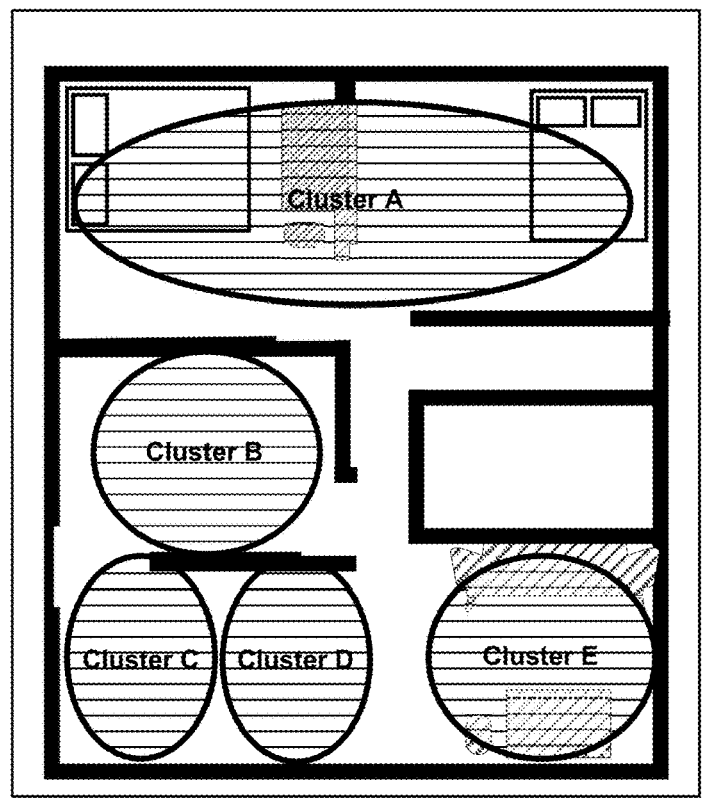
FIG. 6A illustrates an example outcome of clusters that may be produced by an unsupervised machine learning model.

FIG. 6A illustrates an example outcome of clusters that may be produced by an unsupervised machine learning model. In this example, five clusters A-E are generated by the unsupervised machine learning model. While cluster B and cluster E each corresponds to a single and unique room, cluster A encompasses two adjacent rooms, and cluster C and cluster D correspond to the same room. The former case may represent an unwanted unification, and the latter case may represent an unwanted split.

Figure 6B:
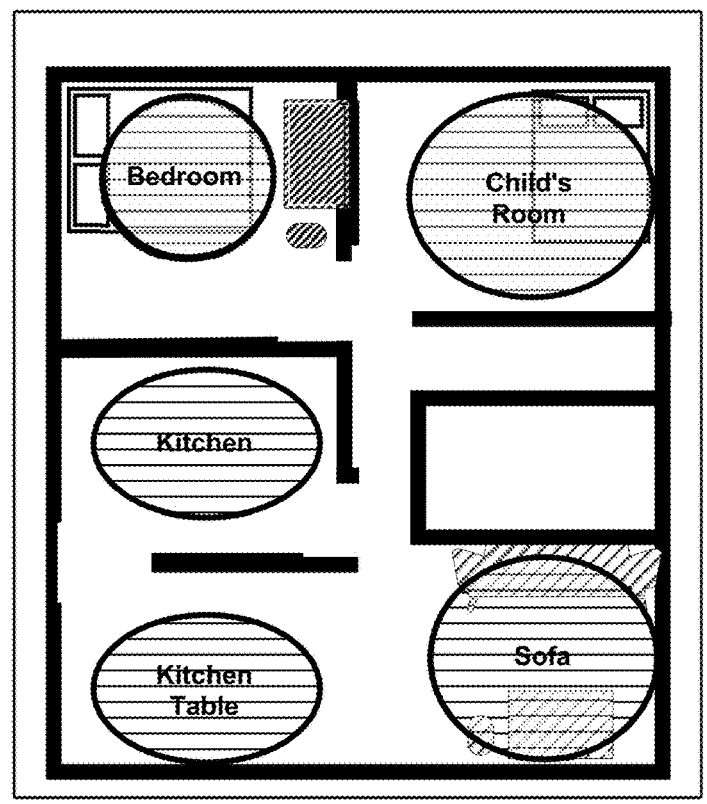
FIG. 6B illustrates an example of a desirable outcome of clusters for a machine learning model.

FIG. 6B illustrates an example of a desired outcome. In this example, each cluster corresponds to a single and unique room of the home. For example, the five clusters correspond to the bedroom, the child's room, the kitchen, the kitchen table, and the sofa, respectively.

V. Semi-Supervised Machine Learning for Microlocation

According to some embodiments, a semi-supervised machine learning model is provided for classifying an input data point as associated with a particular cluster of a plurality of clusters of data points. A tagged sample set and an untagged sample set are combined to train the machine learning model. Because the semi-supervised machine learning model is a classification model, the possible issues with unsupervised machine learning discussed above can be prevented or mitigated.

A. Using Both Tagged Samples and Untagged Samples

Figure 7:
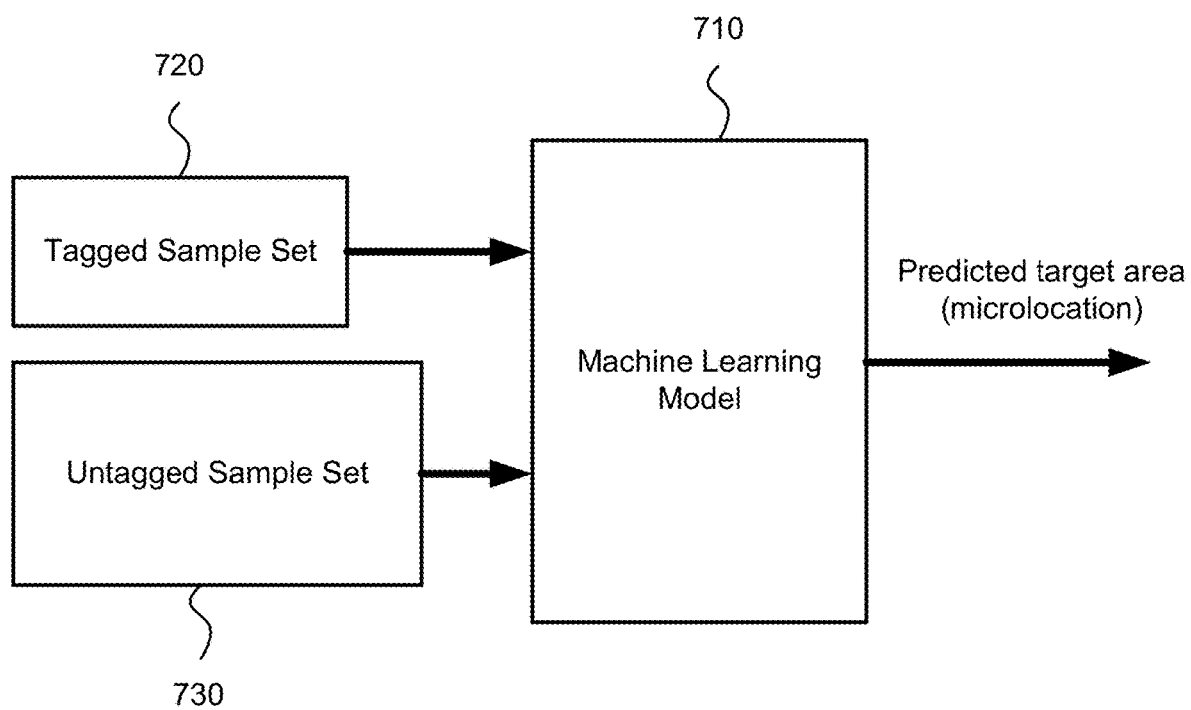
FIG. 7 shows a simplified block diagram of a semi-supervised machine learning model according to some embodiments.

FIG. 7 shows a simplified block diagram of a machine learning model 710 according to some embodiments. A relatively small number of tagged samples can be collected for each desired target area. For instance, in the example illustrated in FIG. 6B, the desired target areas can be the bedroom, the child's room, the kitchen, the kitchen table, and the sofa. A few tagged samples (e.g., 10 samples or the like) can be collected in each of the those desired target areas. Each tagged sample includes a data point comprising signal values, and is labeled with one of the desired target areas.

The tagged samples form a tagged sample set 720, which can be used to train the machine learning model 710. Each tagged sample in the tagged sample set 720 includes a respective data point and a respective desired target area as an input-output pair. The desired target area is the ground truth. The machine learning model 710 can be trained to classify an input data point as associated with a respective target area of the set of desired target areas. Thus, a detected target would always match one of the desired target areas. In comparison, as discussed above, the clusters produced by an unsupervised machine learning model may or may not correspond to the desired target areas.

Because the tagged sample set 720 is likely sparse including only a small number of tagged samples, the machine learning model 710 can be "noisy" (e.g., the predictions may be insufficiently accurate). According to some embodiments, the tagged sample set 720 can be combined with an untagged sample set 730 to train the machine learning model 710. The untagged sample set 730 can include a relatively large number of untagged samples (e.g., 500 samples or more) that are collected sporadically over a period of time triggered by various day-to-day usage events, as discussed above with reference to FIG. 5. The untagged samples form an untagged sample set 730. The untagged sample set 730 can be combined with the tagged sample set 720 for training the machine learning model 710, so that the machine learning model 710 can make more accurate predictions.

Figure 8:
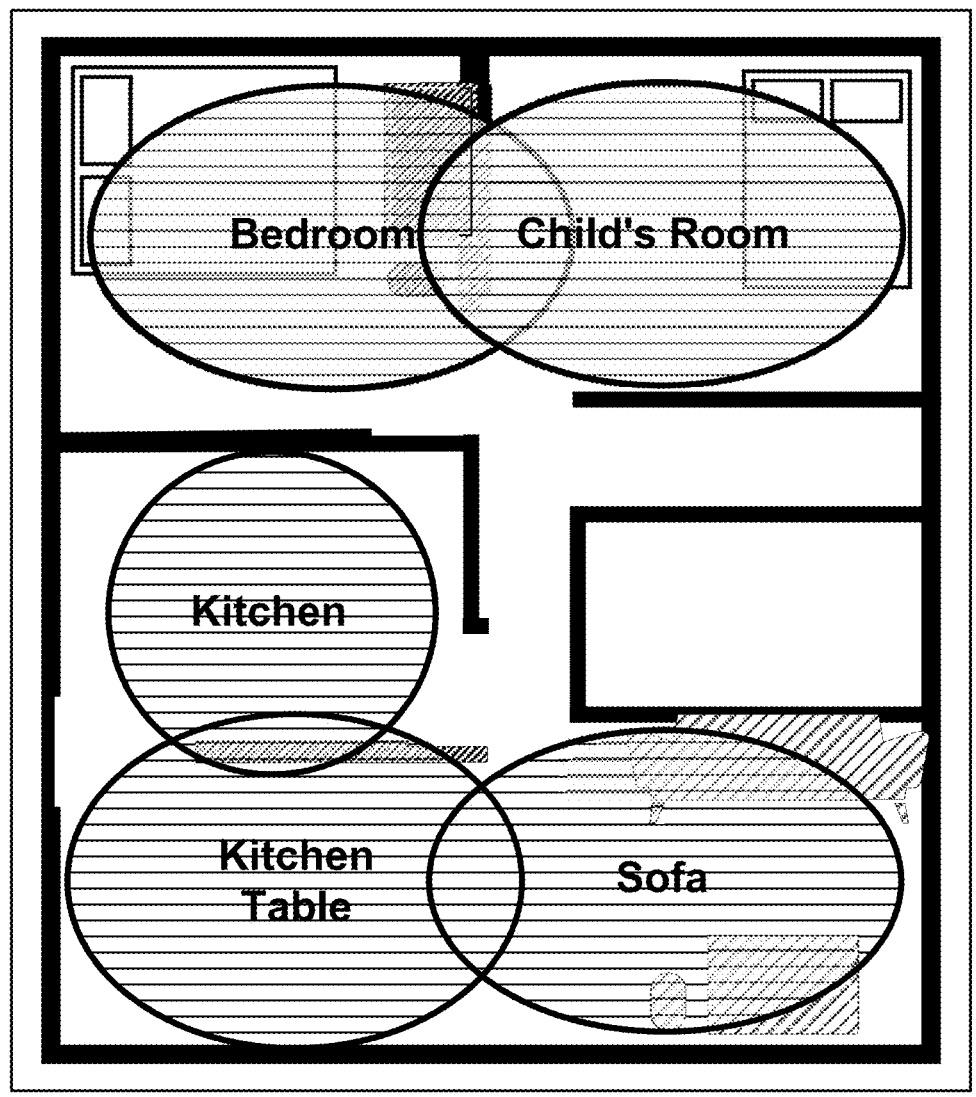
FIG. 8 illustrates an example outcome produced by a semi-supervised machine learning model according to some embodiments.

After the machine learning model 710 has been trained, a new data point can be input into the machine learning model 710 to obtain a predicted target area. The predicted target area is also referred to as a predicted microlocation. Because the semi-supervised machine learning model is a classification model, a predicted target area would always match one of the desired target areas. The challenge for the semi-supervised machine learning can be to refine detection boundaries. For instance, in the example illustrated in FIG. 8, the boundaries between the bedroom and child's room, and/or the boundaries between the kitchen and the kitchen table and between the kitchen table and the sofa can be slightly overlapping.

According to some embodiments, the tagged sample set 720 and the untagged sample set 730 can include samples collected by multiple mobile devices that have the same set of sensors. Once trained, the machine learning model 710 can be used for microlocation prediction by all of the mobile devices.

B. Self-Training Approach of Semi-Supervised Machine Learning

According to some embodiments, the machine learning model 710 can be initially trained using a supervised learning algorithm based on the tagged sample set 720 only. After the initial training, the machine learning model 710 can be then applied to the untagged sample set 730 to generate more tagged samples as input for the supervised learning. For example, the machine learning model 710 can add labels to those untagged samples that it has sufficient confidence as associated with one of the desired target areas. Those untagged samples to which labels have been added may be referred to as quasi-tagged samples.

The machine learning model 710 can then be re-trained using the supervised learning algorithm based on the combination of the tagged samples in the tagged sample set 720 and the quasi-tagged samples from the untagged sample set 730. This semi-supervised machine learning approach is also referred to as self-training. The self-training process can be repeated periodically as more and more untagged samples are collected. For example, the machine learning model 710 can be re-trained every night, every weekend, or the like. As more and more quasi-tagged samples are created and after repeated re-training, the machine learning model 710 can become more and more accurate.

According to some embodiments, if a data point of an untagged sample is sufficiently "similar" to the cluster of data points associated with the tagged samples of a particular target area, that untagged sample can be labeled with the particular target area. Various criteria can be used for determining whether a data point is sufficiently similar to the cluster of data points. For example, a threshold distance between the data point and the cluster of data points can be used as a criterion. In some implementations, the determination can be that the untagged sensor location is within a specified distance of a centroid of a cluster corresponding to a target location.

Other semi-supervised learning techniques can also be used, including for example, low density based methods such as TSVM (transductive support vector machine), and graph-based methods such as suggested in the paper by Zhu, Z. Ghahramani, and J. Lafferty, Semisupervised Learning Using Gaussian Fields and Harmonic Functions. In Proc. of the International Conference on Machine Learning (ICML), 2003.

C. Labelling Tagged Samples

Tagged samples can be labeled with various desired targets according to various embodiments. According to some embodiments, tagged samples can be labeled with target areas. For instance, in the example illustrated in FIG. 6B, those tagged samples generated while the mobile device is in the bedroom can be labeled with "bedroom," and those tagged samples generated while the mobile device is in the kitchen can be labeled with "kitchen," and so on.

According to some embodiments, tagged samples can be labeled with target applications or target accessory devices. For instance, referring to FIG. 6B, if the user usually opens a video streaming app when the user is on the sofa, those tagged samples generated while the user is on the sofa can be labeled with "YouTube" or generally with a video streaming app category. If the user usually turns on an alarm clock while the user is in the bedroom, those tagged samples generated while the user is in the bedroom can be labeled with "alarm clock." In some cases, the label of a tagged sample doesn't have to always correspond to the location of the mobile device when the tagged sample is generated. For example, if the user usually turns on the bedroom light when the user is in the kitchen, tagged samples generated while the user is in the kitchen can be labeled with "bedroom light."

According to some embodiments, tagged samples can be labeled with coordinates in a room. For example, a mobile device can be equipped with a 3D scanner (e.g., a LiDAR). The 3D scanner can scan a room and determine the coordinates of the mobile device in the room (e.g., using simultaneous localization and mapping, or SLAM). Finer location resolution than a room can be possibly achieved. For example, the machine learning model can predict that the user is sitting on the sofa in the living room. As another example, in a great room, the machine learning model can predict that the user is at the kitchen or at the dining table.

D. Generating Tagged Samples

Tagged samples can be generated using various methods. According to some embodiments, a user can request tagged samples and entering the labels for the tagged samples manually. For example, an application (e.g., a home application, a voice command application, such as Siri®) that uses microlocations can allow a user to provide a request for generating tagged samples. For instance, an application can provide a user interface on a screen of the mobile device to enable a user to request a tagged sample. When a tagged sample is requested, the mobile device can measure signal values at the location of the mobile device when the request is received to obtain a data point. Once the data point is obtained, the user interface can prompt the user to enter a label for the tagged sample. For instance, the user interface can show a popup window for the user to enter a label. The user can enter the label by typing or by voice. For instance, if the user requests a tagged sample when the user is in the bedroom, the user can enter "bedroom" as the label, or "alarm clock" as the label (assuming that the application is a home application, and the user wants to associate the bedroom location with turning on the alarm clock).

Figure 9A:
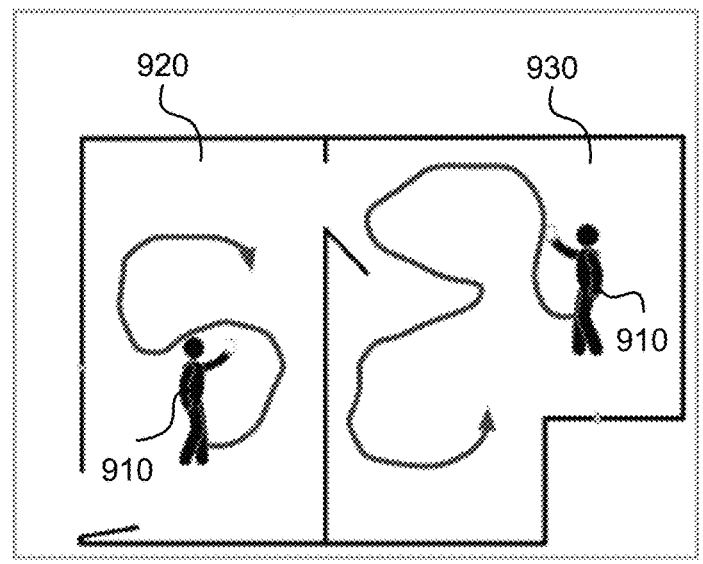
FIGS. 9A-9C illustrates an example of testing a semi-supervised machine learning model according to some embodiments.
Figure 9B:
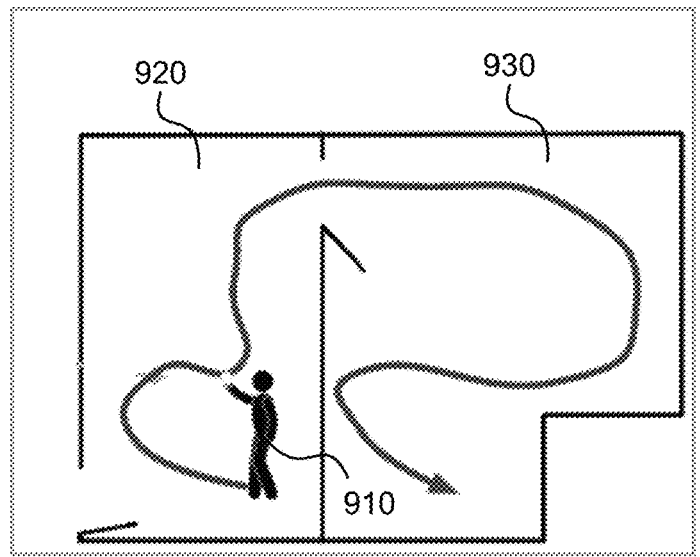
Figure 9C:
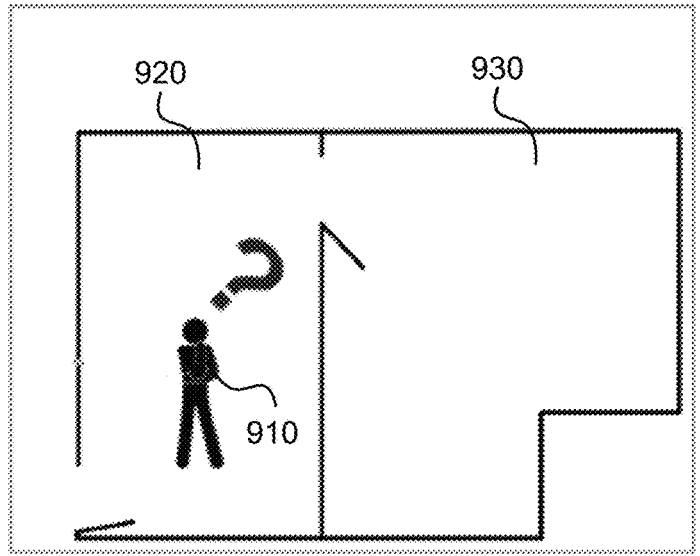

According to some embodiments, tagged samples can be obtained during home mapping. FIG. 9A illustrates an example. The user 910 can walk into various rooms (or certain locations) in the home while holding the mobile device, and request several tagged samples while the user is in each room. For instance, the user 910 can walk around the bedroom 920, and request several tagged samples. At each request, the mobile device can obtain a data point by measuring one or more signal values from one or more signals emitted by one or more signal sources located within the home. At a prompt, the user can enter "bedroom" as the labels for those tagged samples (e.g., by typing or by voice). Similarly, the user 910 can walk around the living room 930, and request several tagged samples. The user can enter "living room" as the labels for those tagged samples. The user can request tagged samples in each of the desired target locations in the home (e.g., bedroom, the living room, the kitchen, the child's room, and so on).

According to some embodiments, an application can automatically generate tagged samples without the user actively requesting them. For example, when a user opens the front door using a home application on the mobile device while in the driveway (assuming that the front door is equipped with a smart lock), the home application can automatically generate a tagged sample by measuring signal values at that location, and labeling that tagged sample with "front door." Subsequently, after the machine learning model has been trained, the home application can provide "opening front door" as a recommendation on the user interface or automatically opens the front door, when the machine learning model predicts that the user is in the drive way (e.g., when the machine learning model determines that the data point is "similar" to the cluster of data points associated with the driveway).

As another example, a wireless streaming application can use a semi-supervised machining learning model for predicting target devices to project video or audio. Initially, a user can stand in the living room, and manually select the living room TV as the target device in the wireless streaming application. Upon detecting this action, the wireless streaming application can measure a first data point, and label the first data point with "living room TV." Similarly, if the user manually select the bedroom TV as the target device when he is in the bedroom, the wireless streaming application can measure a second data point, and label the second data point with "bedroom TV." Subsequently, after the machine learning model has been trained, the wireless streaming application can provide the living room TV as a recommendation when the machine learning model predicts that the user is in the living room, or can provide the bedroom TV as a recommendation when the machine learning model predicts that the user is in the bedroom.

E. Application-Specific Models

According to some embodiments, each application can have a dedicated microlocation machine learning model that is tailor made specifically for its usage. The dedicated microlocation machine learning model may be referred to as an application-specific machine learning model.

1. Application-Specific Model with Samples Tagged with Target Areas

Figure 10A:
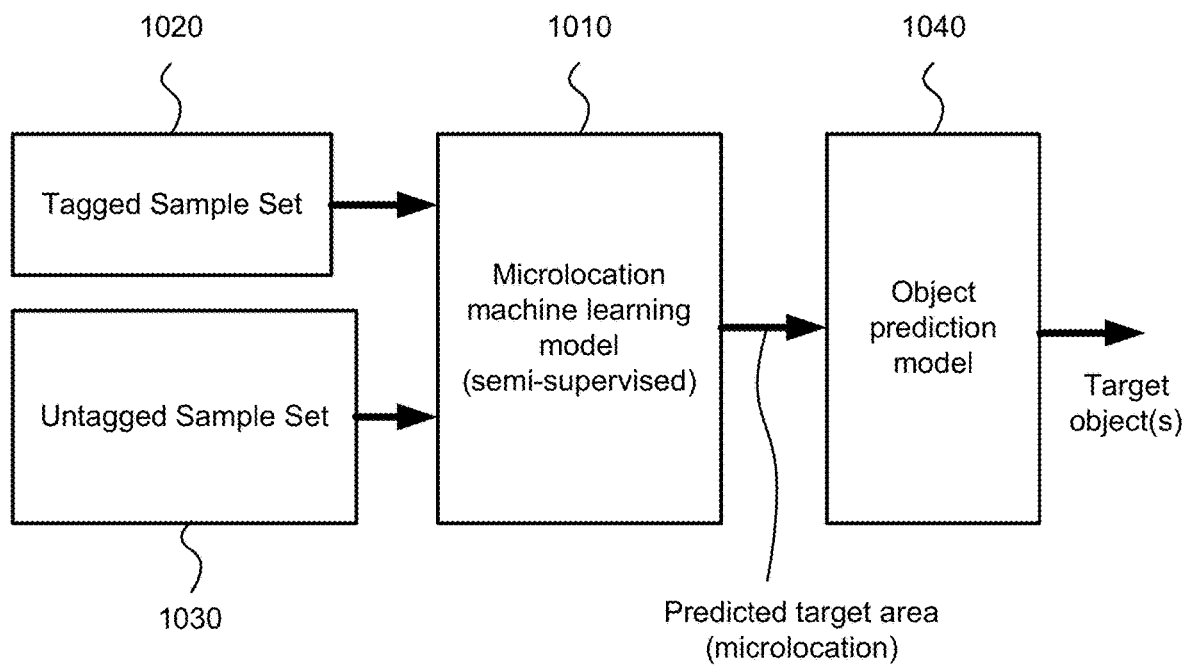
FIG. 10A shows a simplified block diagram of a prediction system for an application including an application-specific microlocation machine learning model according to some embodiments.

FIG. 10A shows a simplified block diagram of a prediction system for an application including an application-specific microlocation machine learning model 1010 according to some embodiments. The application-specific microlocation machine learning model 1010 can have a tagged sample set 1020 tailor made for its usage, and can assign labels to the quasi-tagged samples from the untagged sample set 1030 according to its usage.

For example, a home application can predict accessory devices that can be controlled via the home application (e.g., lights, thermostat, window shade, smart lock, etc.). The home application can allow a user to generate tagged samples at various locations in the user's home where he normally uses various accessory devices. For instance, assume that the user normally turns on the alarm clock when he is in the bedroom, adjusts the thermostat when he is in the living room, and opens the garage door when he is in the kitchen. During home mapping, the user can request several tagged samples in the bedroom and label those tagged samples with "bedroom," request several tagged samples in the living room and label those tagged samples with "living room," and request several tagged samples in the kitchen and label those tagged samples with "kitchen."

After the microlocation machine learning model 1010 has been trained, given a current data point as input, the microlocation machine learning model 1010 can output a predicted target area. The predicted target area can be input into an object prediction model 1040. The object prediction model 1040 can provide a probability of an action occurring at the predicted target area (e.g., a certain room in the home), and determine which action to perform based on the probability. For example, the object prediction model 1040 can determine which action to perform based on a probability of a given action being the highest and above a threshold. For example, if the microlocation machine learning model 1010 predicts that the current data point corresponds to the bedroom, the object prediction model 1040 may determine to turn on the alarm clock or recommend the alarm clock to the user on the mobile device. According to some embodiments, the object prediction model 1040 can be a machine learning model that is trained to predict target objects using historical user actions and contextual patterns for data points corresponding to the target location.

2. Application-Specific Model with Samples Tagged with Actions

According to some embodiments, the tagged samples can be labeled with actions instead of location names, as discussed above. For instance, in the above example, the user can label the tagged samples requested in the bedroom with "alarm clock," label the tagged samples requested in the living room with "thermostat," and label the tagged samples requested in the kitchen with "garage door." The home application can associate those labels with the corresponding actions. In those embodiments where the application automatically generates tagged samples, the tagged samples can be labeled with the associated actions automatically. For instance, when the user turn on the alarm clock manually while he is in the bedroom, a tagged sample can be automatically generated by measuring the data point at that location and labeling it with "alarm clock."

Figure 10B:
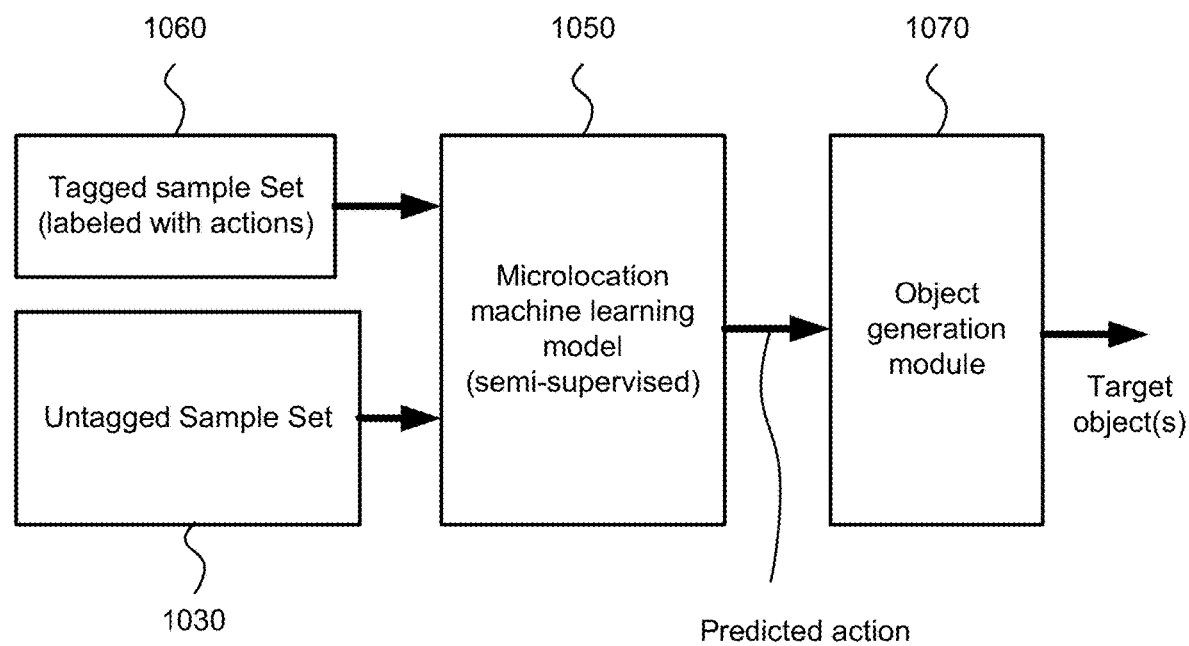
FIG. 10B shows a simplified block diagram of a prediction system for an application including an application-specific microlocation machine learning model according to some embodiments.

FIG. 10B shows a simplified block diagram of a prediction system for an application including an application-specific microlocation machine learning model 1050 according to some embodiments. The tagged samples in the tagged sample set 1060 are labeled with actions. After the microlocation machine learning model 1050 has been trained, given a current data point as input, the microlocation machine learning model 1050 can output a predicted action. An object generation module 1070 can be configured to generate a target object based on the predicted action. For instance, in the above home application example, if the microlocation machine learning model 1050 predicts that a current data point is associated with the cluster of data points classified as "alarm clock," the object generation module 1070 can generate the "alarm clock" as the target object. The home application can turn on the alarm clock or recommend the alarm clock to the user on the mobile device.

As another example, an app suggestion application can have a dedicated machine learning model for predicting applications that the user likely wants to open at a given location. For example, the user may tend to open a video streaming app while in the living room, open texting while in the bedroom, open a music streaming app while in the kitchen, open email while in the bathroom, and so on. The tagged samples can be generated specifically for those situations. Similarly, untagged samples can be assigned as quasi-tagged samples according to those situations. In other implementations, the video streaming app or the music streaming app can have a dedicated machine learning model, and an arbiter module can determine which application to suggest, e.g., based on probabilities for a particular action by the particular application as predicted by the dedicated machine learning model for the respective application.

In this case, the arbiter module can be viewed as the app suggestion module.

As a further example, a battery charging application can predict the type of charging (e.g., an all-night charging or a short charging) based on location. For example, if a user charges the battery in the bedroom when the user goes to sleep, it would be an all-night charging; if the user charges the battery in the kitchen, it would be a short charging. Tagged samples can be generated while the user is in the bedroom and be labeled with "all-night charging." Similarly, tagged samples can be generated while the user is in the kitchen and be labeled with "short charging." For instance, if the machine learning model determines that a current data point is associated with the cluster of data points classified as "all-night charging," the battery charging application can optimize the charging accordingly for optimal battery performance.

3. Object Predication System for Multiple Applications

According to some embodiments, an object prediction system can be run on a mobile device for multiple applications. Each application can provide its own predicted objects. For example, a home application can provide predicted accessory devices, a video streaming application can provide a prediction of whether it will be used and potentially a type of video, a music streaming application can provide a prediction of whether it will be used and potentially a type of audio file, and an app suggestion application can provide predicted applications. Upon detecting a triggering event (e.g., turning on the screen), the object prediction system may use an arbiter module to determine whether to provide those objects predicted by the home application or those objects predicted by the app suggestion application.

Figure 11:
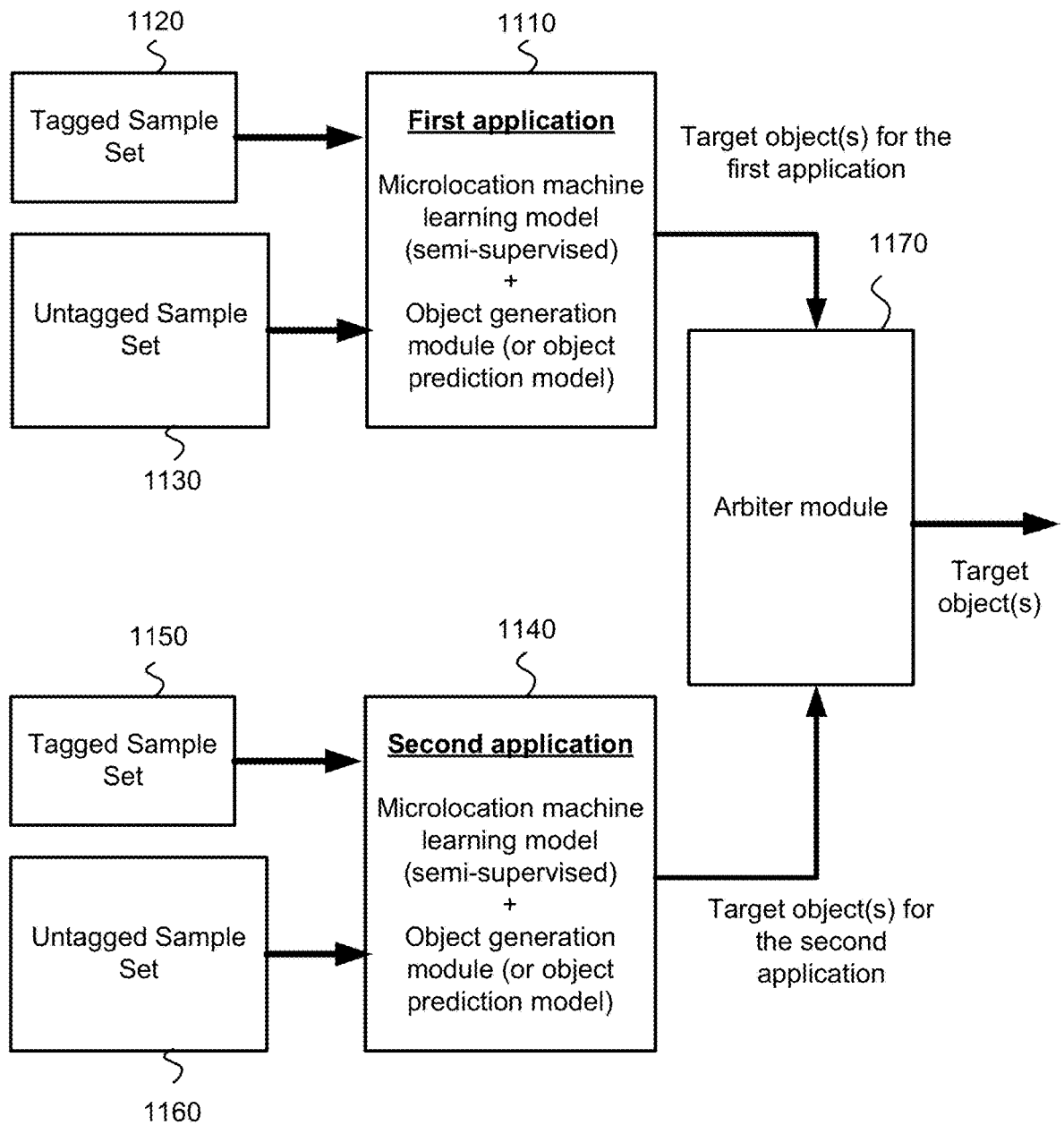
FIG. 11 shows a simplified block diagram of an object prediction system for multiple applications according to some embodiments.

FIG. 11 shows a simplified block diagram of an object prediction system for multiple applications according to some embodiments. A first application 1110 can include a first microlocation machine learning model and a first object generation module (or object prediction model) tailored made for its use. The first microlocation machine learning model can have a first tagged sample set 1120 tailored made for its use, and a first untagged sample set 1130. A second application 1140 can include a second microlocation machine learning model and a second object generation module (or object prediction model) tailored made for its use. The second microlocation machine learning model can have a second tagged sample set 1150 tailored made for its use, and a second untagged sample set 1160.

According to some embodiments, samples can be shared across applications. For example, a tagged sample for the home application can be used as an untagged sample for the app suggestion application. For example, for the home application, a tagged sample can include a data point with the label "alarm clock" or "bedside lamp." The tagged sample can be used as an untagged sample for the app suggestion application. The app suggestion application can assign this untagged sample as a quasi-tagged sample with the label "email," e.g., if the sensor location is sufficiently close to a target location (cluster) that has a label "email." The target areas (clusters of sensor locations) for different applications can overlap. For instance, both the home application and the app suggestion application can have a cluster of sensor locations that correspond to the bedroom. The first application 1110 can output one or more predicted target objects for the first application 1110. The second application 1140 can output one or more predicted target objects for the second application 1140.

An arbiter module 1170 can determine whether to provide the predicted target objects for the first application 1110 or the predicted target objects for the second application 1140. For example, the arbiter module 1170 can determine whether the current data point is more similar to the target location predicted by the first microlocation machine learning model or the target location the second microlocation machine learning model. Upon determining that the current data point is more similar to the target location predicted by the first microlocation machine learning model, the arbiter module 1170 can determine to provide the predicted target objects for the first application 1110. Upon determining that the current data point is more similar to the target location predicted by the second microlocation machine learning model, the arbiter module 1170 can determine to provide the predicted target objects for the second application 1140.

In cases in which the target area predicted by the first microlocation machine learning model and the target area predicted by the second microlocation machine learning model substantially overlap, the arbiter module 1170 can predict a 50%/50% probability for each. In such cases, the arbiter module 1170 may output the predicted target objects for both the first application and the second application as recommendations.

F. Fusion of Different Sensors

As discussed above, RF-fingerprints localization methods in which signals received from several static RF emitters can be aggregated into a "fingerprint" vector, which has one or more values for each signal type. Then similarity between such vectors can be used to correlate sensor's perception to physical location. Accordingly, some embodiments can aggregate signals received from different types of RF emitters (e.g., WiFi, BT, BLE, UWB, etc.) together into a single fingerprint, which is used to determine sensor locations that can be used in various ways, as described herein. The fingerprint can be then used to compute a similarity measure (e.g., a distance in the vector values) between two or more vectors without the need to separate the different types of RF technologies. In addition, parameters (e.g., different weights for the different types of signals) can be provided to adjust the similarity computation to consider the unique features of each RF technology. For example, RF ranging using UWB signals can be rather accurate, but may have limited detection range. Thus, if the signal (sensor) values suggest a short range, then UWB values could be weighted higher as part of determining the similar measure. But if the signal values suggest a longer range, then the UWB values in the fingerprint vector can be weighted less VI. Methods of Predicting Target Objects for a Mobile Device Embodiments provide various methods of predicting target objects that uses a semi-supervised machine learning model for predicting a target location. In cases in which tagged samples are labeled with target locations, a method of predicting target objects can use a prediction model to predict target objects based on a predicted target location. In cases in which tagged samples are labeled with actions, the semi-supervised machine learning model can directly predict a target action.

A. Location-Based Model and Prediction Model

According to some embodiments, a method of predicting target objects (e.g., applications, accessory devices, and the like) can use a semi-supervised microlocation machine learning model for predicting a target location, and a prediction model (e.g., a machine learning model or other model) for predicting target objects based on the target location.

Figure 12:
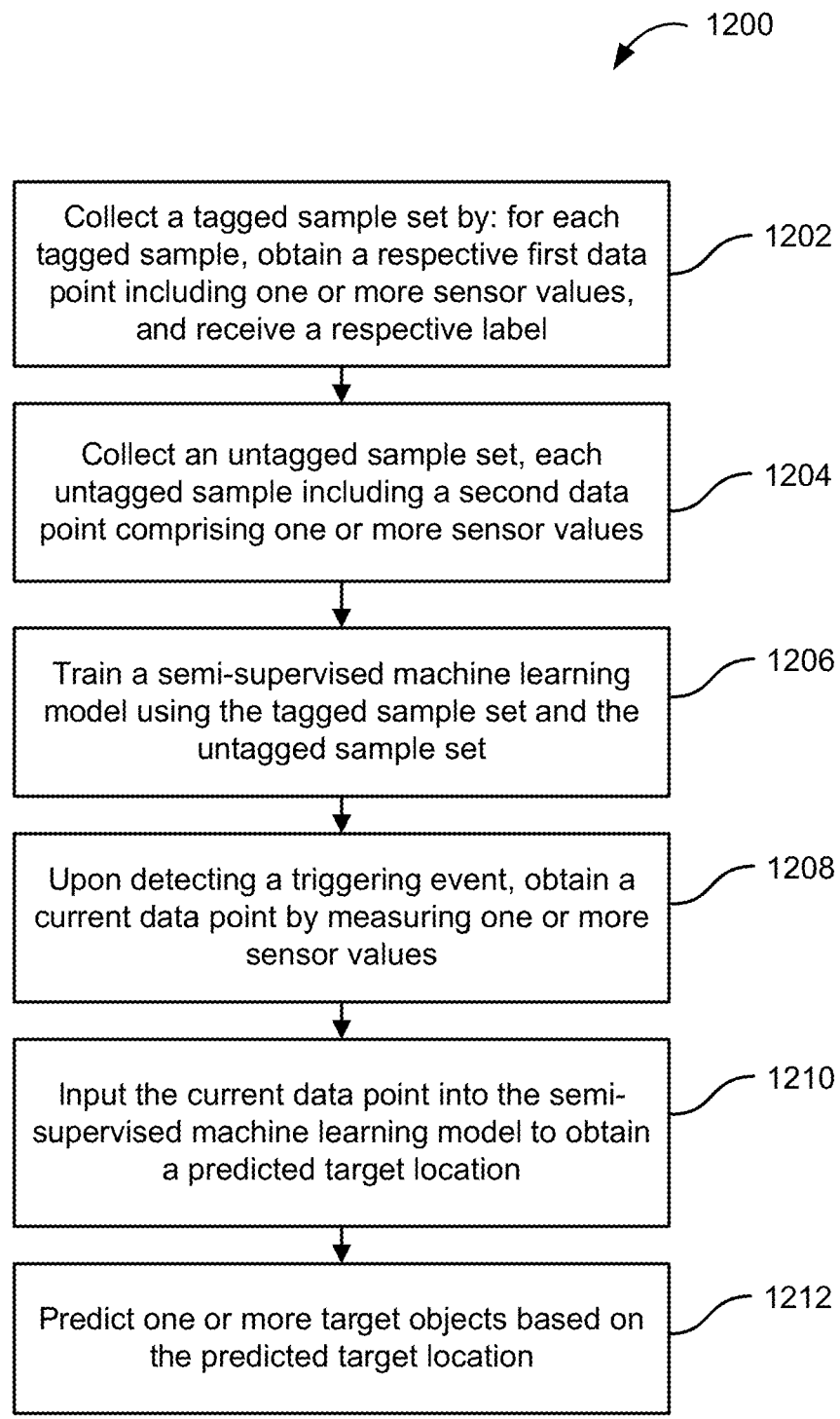
FIG. 12 is a flowchart of a method of predicting target objects for a mobile device according to some embodiments.

FIG. 12 is a flowchart of a method 1200 of predicting target objects for a mobile device according to some embodiments.

At 1202, a tagged sample set is collected. The tagged sample set includes a plurality of tagged samples. Collecting the tagged sample set includes, for each respective tagged sample, obtain a respective first data point. The respective first data point includes one or more sensor values from one or more signals emitted by one or more signal sources located within a physical area, the one or more sensor values measured by the mobile device using one or more sensors while the mobile device is at a respective target location of a plurality of target locations in the physical area. A respective label representing the respective target location is received from a user of the mobile device. The respective tagged sample includes the respective first data point and the respective label. According to some embodiments, collecting the tagged sample set is performed in response to receiving a request for generating tagged samples from the user of the mobile device.

At 1204, an untagged sample set is collected. The untagged sample includes a plurality of untagged samples. Each respective untagged sample includes a respective second data point. The respective second data point includes one or more sensor values from one or more signals emitted by the one or more signal sources and measured by the mobile device using the one or more sensors. According to some embodiments, collecting the untagged sample set is performed over a period of time (e.g., a day, a week, a month, and the like).

At 1206, a semi-supervised machine learning model is trained using the plurality of tagged samples in the tagged sample set and the plurality of untagged samples in the untagged sample set. The semi-supervised machine learning model is trained to classify an input data point as corresponding to a particular target location of the plurality of target locations.

According to some embodiments, training the semi-supervised machine learning model can include performing an initial training using the plurality of tagged samples in the tagged sample set. The respective first data point and the respective label in each respective tagged sample form an input-output pair for the initial training. For each respective untagged sample in the untagged sample set, the semi-supervised machine learning model can determine whether the respective second data point of the respective untagged sample is associated with a first target location of the plurality of target locations. Upon determining that the respective second data point of the respective untagged sample is associated with the first target location of the plurality of target locations, the respective untagged sample can be assigned as a quasi-tagged sample with a respective label corresponding to the first target location. The semi-supervised machine learning model can be re-trained using the plurality of tagged samples in the tagged sample set and the quasi-tagged samples.

At 1208, upon detecting a triggering event, a current data point is obtained by measuring one or more sensor values. According to various embodiments, the triggering event can be turning on the screen of the mobile device, plugging in an accessory, opening an application, and the like. As further examples, At 1210, once the semi-supervised machine learning model has been trained, the current data point is input into the semi-supervised machine learning model to obtain a predicted target location. The semi-supervised machine learning model classifies the current data point as corresponding to the predicted target location.

At 1212, one or more target objects are predicted based on the predicted target location. According to some embodiments, a separate machine learning model (prediction model) can be trained to predict target objects using historical user actions and contextual patterns.

According to some embodiments, the one or more target objects can be provided to the user as recommendations. According to some other embodiments, an action can be automatically performed based on the one or more target objects.

According to some embodiments, the mobile device can periodically measure the sensor values. Once the likelihood of using an application, accessory device, or performing an action is sufficiently high, target objects can be predicted by performing the steps of 1210 and 1212.

The mobile device can comprises a plurality of a semi-supervised machine learning models, each dedicated to a respective application and providing a respective predicted target location. Predicting the one or more target objects can include comparing, by an arbiter module, outputs of the respective prediction models to determine which one or more targets objects to provide on a user interface, to implement, or to provide to another software module on the mobile device. For example, an action act be performed or the recommendation (e.g., a device) can be provided to another software module that communicates with the device.

It should be appreciated that the specific steps illustrated in FIG. 12 provide a particular method of predicting target objects according to some embodiments. Other sequences of steps may also be performed according to alternative embodiments. For example, alternative embodiments of the present invention may perform the steps outlined above in a different order. Moreover, the individual steps illustrated in FIG. 12 may include multiple sub-steps that may be performed in various sequences as appropriate to the individual step. Furthermore, additional steps may be added or removed depending on the particular applications. One of ordinary skill in the art would recognize many variations, modifications, and alternatives.

B. Action-Based Model

Figure 13:
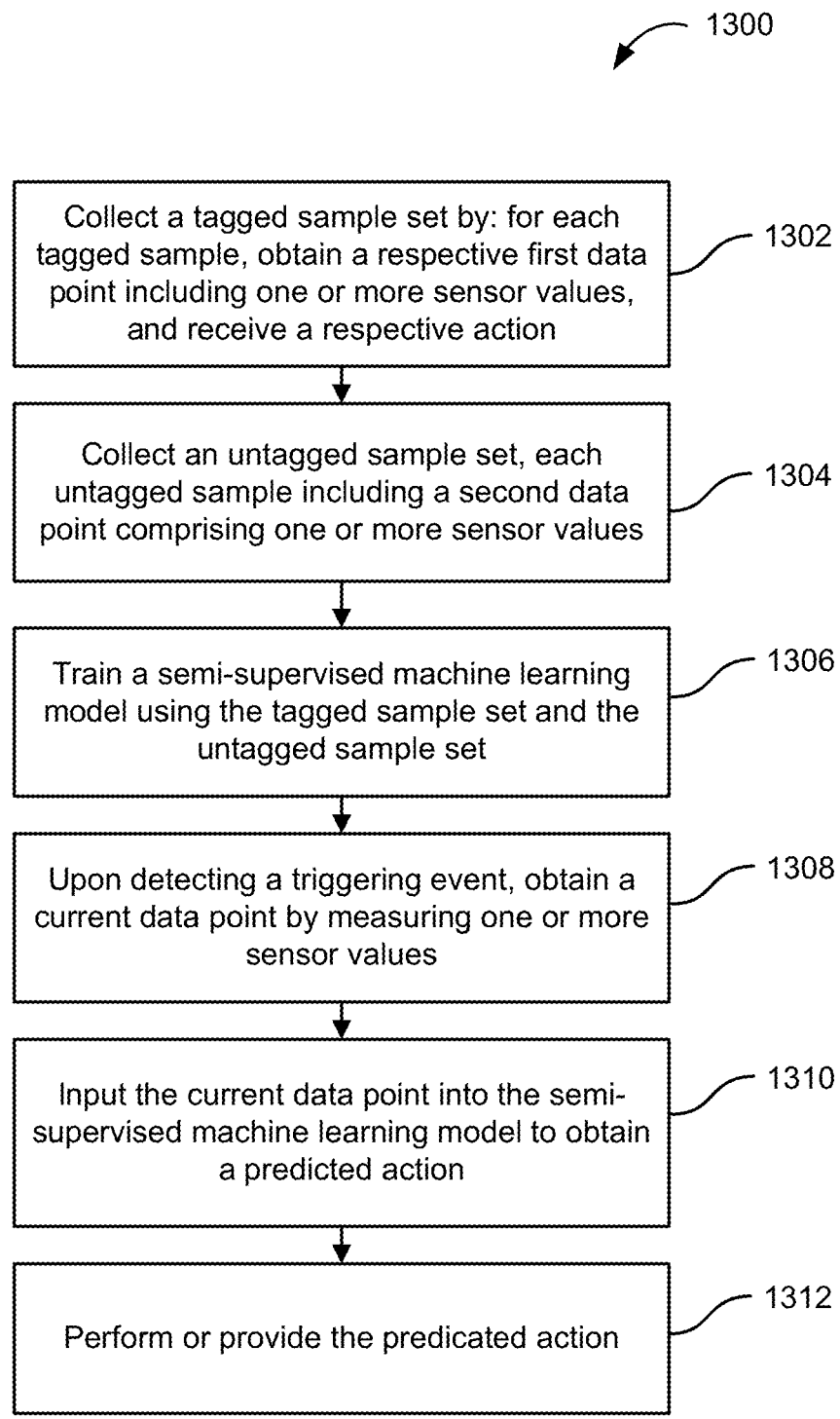
FIG. 13 is a flowchart of a method of predicting actions for a mobile device according to some embodiments.

According to some embodiments, a method of predicting actions can use a semi-supervised microlocation machine learning model to predict a target action. FIG. 13 is a flowchart of a method 1300 of predicting actions for a mobile device according to some embodiments.

At 1302, a tagged sample set is collected. The tagged sample set includes a plurality of tagged samples. Collecting the tagged sample set includes, for each respective tagged sample, obtain a respective first data point. The respective first data point includes one or more sensor values from one or more signals emitted by one or more signal sources located within a physical area, the one or more sensor values measured by the mobile device using one or more sensors while the mobile device is at a respective target location of a plurality of target locations in the physical area. A respective action of a plurality actions is received through the mobile device while the mobile device is at the respective target location. Each respective action of the plurality of actions corresponds to a respective target location of the plurality of target locations. The respective tagged sample includes the respective first data point and the respective action. According to some embodiments, collecting the tagged sample set is performed in response to receiving a request for generating tagged samples from the user of the mobile device.

At 1304, an untagged sample set is collected. The untagged sample includes a plurality of untagged samples. Each respective untagged sample includes a respective second data point. The respective second data point includes one or more sensor values from one or more signals emitted by the one or more signal sources and measured by the mobile device using the one or more sensors. According to some embodiments, collecting the untagged sample set is performed over a period of time (e.g., a day, a week, a month, and the like).

At 1306, a semi-supervised machine learning model is trained using the plurality of tagged samples in the tagged sample set and the plurality of untagged samples in the untagged sample set. The semi-supervised machine learning model is trained to classify an input data point as corresponding to a particular target location of the plurality of target locations.

At 1308, upon detecting a triggering event, a current data point is obtained by measuring one or more sensor values. According to various embodiments, the triggering event can be turning on the screen of the mobile device, plugging in an accessory, opening an application, and the like.

At 1310, once the semi-supervised machine learning model has been trained, the current data point is input into the semi-supervised machine learning model to obtain a predicted target location. The semi-supervised machine learning model classifies the current data point as corresponding to the predicted target location. The predicted target location corresponds to a predicted action of the plurality of actions.

At 1312, the predicted action is performed, or is provided as a recommendation. For example, the semi-supervised machine learning model can be dedicated to a home application installed on the mobile device. The predicted action can include an operation of an accessory device controllable by the home application. The operation of the accessory device can be executed, or can be provided as a recommendation. As another example, the semi-supervised machine learning model can be dedicated to an app suggestion application installed on the mobile device. The predicted actin can correspond to a predicted application. The predicted application can be automatically opened, or can be provided as a recommendation.

According to some embodiments, the mobile device can periodically measure the sensor values. Once the likelihood of using an application or accessory device, or performing an action is sufficiently high, the action can be predicted by performing the steps of 1310 and 1312.

It should be appreciated that the specific steps illustrated in FIG. 13 provide a particular method of predicting actions according to some embodiments. Other sequences of steps may also be performed according to alternative embodiments. For example, alternative embodiments of the present invention may perform the steps outlined above in a different order. Moreover, the individual steps illustrated in FIG. 13 may include multiple sub-steps that may be performed in various sequences as appropriate to the individual step. Furthermore, additional steps may be added or removed depending on the particular applications. One of ordinary skill in the art would recognize many variations, modifications, and alternatives.

VII. Example Device

Figure 14:
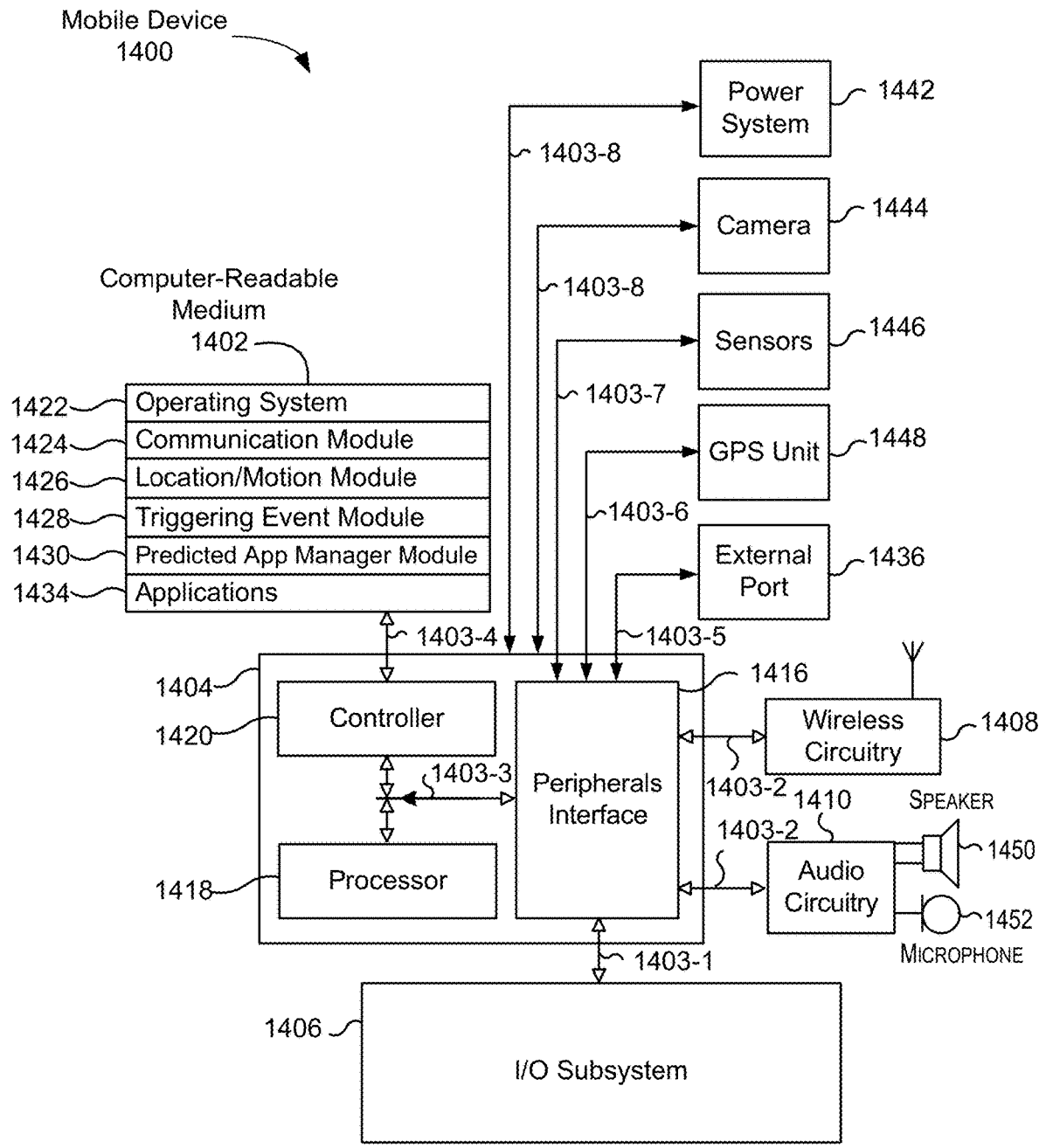
FIG. 14 is a block diagram of an example device, which may be a mobile device, according to some embodiments.

FIG. 14 is a block diagram of an example device 1400, which may be a mobile device. Device 1400 generally includes computer-readable medium 1402, a processing system 1404, an Input/Output (I/O) subsystem 1406, wireless circuitry 1408, and audio circuitry 1410 including speaker 1450 and microphone 1452. These components may be coupled by one or more communication buses or signal lines 1403. Device 1400 can be any portable electronic device, including a handheld computer, a tablet computer, a mobile phone, laptop computer, tablet device, media player, personal digital assistant (PDA), a key fob, a car key, an access card, a multi-function device, a mobile phone, a portable gaming device, a car display unit, or the like, including a combination of two or more of these items.

It should be apparent that the architecture shown in FIG. 14 is only one example of an architecture for device 1400, and that device 1400 can have more or fewer components than shown, or a different configuration of components. The various components shown in FIG. 14 can be implemented in hardware, software, or a combination of both hardware and software, including one or more signal processing and/or application specific integrated circuits.

Wireless circuitry 1408 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. Wireless circuitry 1408 can use various protocols, e.g., as described herein.

Wireless circuitry 1408 is coupled to processing system 1404 via peripherals interface 1416. Interface 1416 can include conventional components for establishing and maintaining communication between peripherals and processing system 1404. Voice and data information received by wireless circuitry 1408 (e.g., in speech recognition or voice command applications) is sent to one or more processors 1418 via peripherals interface 1416. One or more processors 1418 are configurable to process various data formats for one or more application programs 1434 stored on medium 1402.

Peripherals interface 1416 couple the input and output peripherals of the device to processor 1418 and computer-readable medium 1402. One or more processors 1418 communicate with computer-readable medium 1402 via a controller 1420. Computer-readable medium 1402 can be any device or medium that can store code and/or data for use by one or more processors 1418. Medium 1402 can include a memory hierarchy, including cache, main memory and secondary memory.

Device 1400 also includes a power system 1442 for powering the various hardware components. Power system 1442 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 1400 includes a camera 1444. In some embodiments, device 1400 includes sensors 1446. Sensors 1446 can include accelerometers, compasses, gyrometers, pressure sensors, audio sensors, light sensors, barometers, and the like. Sensors 1446 can be used to sense location aspects, such as auditory or light signatures of a location.

In some embodiments, device 1400 can include a GPS receiver, sometimes referred to as a GPS unit 1448. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information. In other embodiments, device 1400 may be configured to identify GLONASS signals, or any other similar type of satellite navigational signal.

One or more processors 1418 run various software components stored in medium 1402 to perform various functions for device 1400. In some embodiments, the software components include an operating system 1422, a communication module (or set of instructions) 1424, a location module (or set of instructions) 1426, a triggering event module 1428, a predicted app manager module 1430, and other applications (or set of instructions) 1434, such as a car locator app and a navigation app.

Operating system 1422 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 1424 facilitates communication with other devices over one or more external ports 1436 or via wireless circuitry 1408 and includes various software components for handling data received from wireless circuitry 1408 and/or external port 1436. External port 1436 (e.g., USB, FireWire, Lightning connector, 60-pin connector, etc.) is adapted for coupling directly to other devices or indirectly over a network (e.g., the Internet, wireless LAN, etc.).

Location/motion module 1426 can assist in determining the current position (e.g., coordinates or other geographic location identifier) and motion of device 1400. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 1426 receives data from GPS unit 1448 and analyzes the signals to determine the current position of the mobile device. In some embodiments, location/motion module 1426 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 1408 and is passed to location/motion module 1426. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 1400 based on the position coordinates of the corresponding transmitters. Regardless of the specific location technology used, location/motion module 1426 receives information from which a location fix can be derived, interprets that information, and returns location information, such as geographic coordinates, latitude/longitude, or other location fix data.

Triggering event module 1428 can include various submodules or systems, e.g., as described herein with respect to FIG. 2A. Furthermore, predicted app manager module 1430 can include various sub-modules or systems, e.g., as described herein with respect to FIG. 3.

The one or more application programs 1434 on the mobile device can include any applications installed on the device 1400, including without limitation, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

The I/O subsystem 1406 can be coupled to a display system (not shown), which can be a touch-sensitive display. The display system displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 1406 can include a display and user input devices such as a keyboard, mouse, and/or track pad. In some embodiments, I/O subsystem 1406 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in medium 1402) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem can be coupled to one or more other physical control devices (not shown), such as push-buttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 1400 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a solid state drive, a hard drive, a CD, or an entire computer system), and may be present on or within different computer products within a system or network. A computer system may include a monitor, printer, or other suitable display for providing any of the results mentioned herein to a user.

As described above, one aspect of the present technology is the gathering and use of data available from various sources to improve prediction of users that a user may be interested in communicating with. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to predict users that a user may want to communicate with at a certain time and place. Accordingly, use of such personal information data included in contextual information enables people centric prediction of people a user may want to interact with at a certain time and place. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of people centric prediction services, the present technology can be configured to allow users to select to "opt in" or "opt out" of participation in the collection of personal information data during registration for services or anytime thereafter. In another example, users can select not to provide location information for recipient suggestion services. In yet another example, users can select to not provide precise location information, but permit the transfer of location zone information. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, users that a user may want to communicate with at a certain time and place may be predicted based on non-personal information data or a bare minimum amount of personal information, such as the content being requested by the device associated with a user, other non-personal information, or publicly available information.

Although the disclosure has been described with respect to specific embodiments, it will be appreciated that the disclosure is intended to cover all modifications and equivalents within the scope of the following claims.

All patents, patent applications, publications, and descriptions mentioned herein are incorporated by reference in their entirety for all purposes. None is admitted to be prior art. Where a conflict exists between the instant application and a reference provided herein, the instant application shall dominate.

What is claimed is:

1. A method of predicting target objects for a mobile device, the method comprising performing by the mobile device:
  collecting a tagged sample set by, for each respective tagged sample of a plurality of tagged samples in the tagged sample set, the tagged sample set including a respective first data point that includes one or more sensor values from one or more signals emitted by one or more signal sources located within a physical area and a respective label representing a respective target location of a plurality of target locations;
  collecting an untagged sample set, each respective untagged sample of a plurality of untagged samples in the untagged sample set including a respective second data point, the respective second data point including one or more sensor values from one or more signals emitted by the one or more signal sources and measured by the mobile device using one or more sensors;
  training a semi-supervised machine learning model using the plurality of tagged samples in the tagged sample set and the plurality of untagged samples in the untagged sample set, the semi-supervised machine learning model being trained to classify an input data point as corresponding to a particular target location of the plurality of target locations;

upon detecting a triggering event, obtaining a current data point by measuring one or more sensor values;

inputting the current data point to the semi-supervised machine learning model to obtain a predicted target location; and predicting one or more target objects based on the predicted target location.

2. The method of claim 1, further comprising providing the one or more target objects as recommendations on a user interface.

3. The method of claim 1, wherein training the semi-supervised machine learning model comprises:

performing an initial training using the plurality of tagged samples in the tagged sample set, wherein the respective first data point and the respective label in each respective tagged sample form an input-output pair for the initial training;

for each respective untagged sample in the untagged sample set and using the semi-supervised machine learning model:

determining whether the respective second data point of the respective untagged sample is associated with a first target location of the plurality of target locations; and upon determining that the respective second data point of the respective untagged sample is associated with the first target location of the plurality of target locations, assigning the respective untagged sample as a quasi-tagged sample with a respective label corresponding to the first target location; and re-training the semi-supervised machine learning model using the plurality of tagged samples in the tagged sample set and the quasi-tagged samples.

4. The method of claim 1, wherein collecting the tagged sample set is performed in response to receiving a request for generating tagged samples from a user of the mobile device.

5. The method of claim 1, wherein collecting the untagged sample set is performed over a period of time.

6. The method of claim 1, wherein the semi-supervised machine learning model is dedicated to a home application installed on the mobile device, and the one or more target objects comprise one or more accessory devices controllable by the home application.

7. The method of claim 6, wherein the home application is configured to provide the one or more accessory devices as recommendations on a user interface.

8. The method of claim 6, wherein the one or more accessory devices comprise a first accessory device, and the home application is configured to initiate an operation of the first accessory device.

9. The method of claim 1, wherein the semi-supervised machine learning model is dedicated to an app suggestion application installed on the mobile device, and the one or more target objects comprise one or more applications.

10. The method of claim 9, wherein the app suggestion application is configured to provide the one or more applications as recommendations on a user interface.

11. The method of claim 10, wherein the one or more applications comprise a first application, and the app suggestion application is configured to launch the first application on the mobile device.

12. The method of claim 1, wherein predicting the one or more target objects uses a prediction model trained with historical user actions at data points corresponding to the predicted target location.

13. The method of claim 12, wherein the mobile device comprises a plurality of a semi-supervised machine learning models, each dedicated to a respective application and providing a respective predicted target location, and wherein predicting the one or more target objects includes:

comparing, by an arbiter module, outputs of the plurality of the semi-supervised machine learning models to determine which one or more targets objects to provide on a user interface, to implement, or to provide to another software module on the mobile device.

14. A method of predicting actions for a mobile device, the method comprising performing by the mobile device:

collecting a tagged sample set by, for each respective tagged sample of a plurality of tagged samples in the tagged sample set, the tagged sample set including a respective first data point that includes one or more sensor values from one or more signals emitted by one or more signal sources located within a physical area, a respective action of a plurality of actions, and a respective label representing the respective action at a respective target location of a plurality of target locations;

collecting an untagged sample set, each respective untagged sample of a plurality of untagged samples in the untagged sample set including a respective second data point, the respective second data point including one or more sensor values from one or more signals emitted by the one or more signal sources and measured by the mobile device using one or more sensors;

training a semi-supervised machine learning model using the plurality of tagged samples in the tagged sample set and the plurality of untagged samples in the untagged sample set, the semi-supervised machine learning model being trained to classify an input data point as corresponding to a particular target location of the plurality of target locations;

obtaining a current data point by measuring one or more sensor values;

inputting the current data point to the semi-supervised machine learning model to obtain a predicted target location, the predicted target location corresponding to a predicted action of the plurality of actions; and performing or providing the predicted action.

15. The method of claim 14, wherein training the semi-supervised machine learning model comprises:

performing an initial training using the plurality of tagged samples in the tagged sample set, wherein the respective first data point and the respective target location in each respective tagged sample form an input-output pair for the initial training;

for each respective untagged sample in the untagged sample set and using the semi-supervised machine learning model:

determining whether the respective second data point of the respective untagged sample is associated with a first target location of the plurality of target locations; and upon determining that the respective second data point of the respective untagged sample is associated with the first target location of the plurality of target locations, assigning the respective untagged sample as a quasi-tagged sample with a respective action corresponding to the first target location; and re-training the semi-supervised machine learning model using the plurality of tagged samples in the tagged sample set and the quasi-tagged samples.

16. The method of claim 14, wherein collecting the tagged sample set is performed in response to receiving a request for generating tagged samples from a user of the mobile device.

17. The method of claim 14, wherein collecting the untagged sample set is performed over a period of time.

18. The method of claim 14, wherein the semi-supervised machine learning model is dedicated to a home application installed on the mobile device, and the plurality of actions comprises operations of a plurality of accessory devices controllable by the home application.

19. The method of claim 14, wherein the semi-supervised machine learning model is dedicated to an app suggestion application installed on the mobile device, and the plurality of actions corresponds to a plurality of applications.

20. The method of claim 14, wherein the semi-supervised machine learning model is dedicated to a streaming application installed on the mobile device, and the plurality of actions corresponds to a plurality of target devices.

\* \* \* \* \*